(12) United States Patent
Lancashire

(10) Patent No.: US 10,594,488 B2
(45) Date of Patent: Mar. 17, 2020

(54) METHOD AND SYSTEM FOR IMPLEMENTING AUTOMATIC TRANSACTION REBROADCASTING FOR TRANSIENT BLOCKCHAINS

(71) Applicant: Proclus Technologies Limited, Hong Kong (CN)

(72) Inventor: David Begor Lancashire, Toronto (CA)

(73) Assignee: Proclus Technologies Limited, Hong Kong (CN)

( * ) Notice: Subject to any disclaimer, the term of this patent is extended or adjusted under 35 U.S.C. 154(b) by 0 days.

(21) Appl. No.: 16/409,449

(22) Filed: May 10, 2019

(65) Prior Publication Data

US 2019/0296915 A1    Sep. 26, 2019

Related U.S. Application Data

(63) Continuation-in-part of application No. 16/249,514, filed on Jan. 16, 2019, which is a continuation of
(Continued)

(51) Int. Cl.
*H04L 9/32* (2006.01)
*G06Q 20/06* (2012.01)
(Continued)

(52) U.S. Cl.
CPC .......... *H04L 9/3236* (2013.01); *G06Q 20/06* (2013.01); *G06Q 20/065* (2013.01);
(Continued)

(58) Field of Classification Search
CPC .... G06Q 20/06; G06Q 20/065; G06Q 20/223; G06Q 20/3823; G06Q 20/3825;
(Continued)

(56) References Cited

U.S. PATENT DOCUMENTS

| 9,892,460 B1 | 2/2018 | Winklevoss et al. |
| 10,230,530 B2 | 3/2019 | Lancashire et al. |

(Continued)

FOREIGN PATENT DOCUMENTS

| CN | 105959307 A | 9/2016 |
| CN | 106296184 A | 1/2017 |

(Continued)

OTHER PUBLICATIONS

Babaioff (Dec. 2011) ACM SIGecom Exchanges, "On Bitcoin and Red Balloons," 10:3, pp. 5-9.
(Continued)

*Primary Examiner* — Theodore C Parsons
(74) *Attorney, Agent, or Firm* — Adsero IP

(57) ABSTRACT

Novel tools and techniques are provided for implementing blockchain transactions, and, more particularly, to methods, systems, and apparatuses for implementing automatic transaction rebroadcasting for transient blockchains. In various embodiments, a first node among a plurality of nodes in a peer-to-peer blockchain network might identify one or more transactions and/or one or more transaction slips in at least one block preceding an identified block in a blockchain. The first node might determine whether each of the identified one or more transactions and/or one or more transaction slips satisfies one or more criteria for rebroadcasting. Based on a determination that at least one transaction or at least one transaction slip satisfies the one or more criteria for rebroadcasting, the first node might re-include the at least one transaction or the at least one transaction slip in a subsequent candidate block that is produced and offered for validation and inclusion in the blockchain.

23 Claims, 14 Drawing Sheets

Related U.S. Application Data application No. 16/052,912, filed on Aug. 2, 2018, now Pat. No. 10,230,530, application No. 16/409,449, which is a continuation-in-part of application No. 16/052,944, filed on Aug. 2, 2018, and a continuation-in-part of application No. 16/052,974, filed on Aug. 2, 2018.

(60) Provisional application No. 62/541,657, filed on Aug. 5, 2017.

(51) Int. Cl.
| | | |
|---|---|---|
| *G06Q 20/38* | (2012.01) | |
| *G06Q 20/40* | (2012.01) | |
| *G06Q 20/22* | (2012.01) | |

(52) U.S. Cl.
CPC ....... *G06Q 20/223* (2013.01); *G06Q 20/3823* (2013.01); *G06Q 20/3825* (2013.01); *G06Q 20/3829* (2013.01); *G06Q 20/401* (2013.01); *H04L 9/3247* (2013.01); *G06Q 2220/00* (2013.01); *H04L 2209/38* (2013.01); *H04L 2209/56* (2013.01)

(58) Field of Classification Search
CPC ............. G06Q 20/3829; G06Q 20/401; G06Q 2220/00; H04L 2209/38; H04L 2209/56; H04L 9/3236; H04L 9/3247
See application file for complete search history.

(56) References Cited

U.S. PATENT DOCUMENTS

| | | |
|---|---|---|
| 2007/0280865 A1 | 12/2007 | Tonev et al. |
| 2008/0264372 A1 | 10/2008 | Sisk et al. |
| 2016/0012424 A1 | 1/2016 | Simon et al. |
| 2016/0012465 A1 | 1/2016 | Sharp |
| 2016/0028552 A1 | 1/2016 | Spanos et al. |
| 2016/0080477 A1 | 3/2016 | Nedeltchev et al. |
| 2016/0267605 A1 | 9/2016 | Lingham et al. |
| 2016/0283920 A1 | 9/2016 | Fisher et al. |
| 2016/0292672 A1 | 10/2016 | Fay et al. |
| 2016/0358161 A1 | 12/2016 | Cobban et al. |
| 2017/0109955 A1 | 4/2017 | Ernest et al. |
| 2018/0039667 A1 | 2/2018 | Pierce et al. |
| 2018/0109541 A1 | 4/2018 | Gleichauf |
| 2019/0043024 A1 | 2/2019 | Lancashire |
| 2019/0044725 A1 | 2/2019 | Lancashire |
| 2019/0044734 A1 | 2/2019 | Lancashire et al. |
| 2019/0080392 A1 | 3/2019 | Youb et al. |
| 2019/0149336 A1 | 5/2019 | Lancashire et al. |
| 2019/0182048 A1 | 6/2019 | Lancashire |

FOREIGN PATENT DOCUMENTS

| | | |
|---|---|---|
| CN | 106503589 A | 3/2017 |
| CN | 106843774 A | 6/2017 |
| CN | 106952124 A | 7/2017 |
| CN | 107005574 A | 8/2017 |
| WO | WO-2017-079652 A1 | 5/2017 |
| WO | WO-2019-029429 A1 | 2/2019 |
| WO | WO-2019-029430 A1 | 2/2019 |
| WO | WO-2019-029431 A1 | 2/2019 |

OTHER PUBLICATIONS

U.S. Appl. No. 16/052,912, filed Aug. 2, 2018; 95 pages.
U.S. Appl. No. 16/052,944, filed Aug. 2, 2018; 93 pages.
U.S. Appl. No. 16/052,974, filed Aug. 2, 2018; 95 pages.
International Search Report and Written Opinion prepared by the State Intellectual Property Office of the P.R. China, as International Searching Authority for PCT International Patent Application No. PCT/CN2018/098317, dated Sep. 30, 2018, 8 pages.
U.S. Appl. No. 16/052,912 Notice of Allowance dated Oct. 29, 2018; 24 pages.
International Search Report and Written Opinion prepared by the State Intellectual Property Office of the P.R. China, as International Searching Authority for PCT International Patent Application No. PCT/CN2018/098316, dated Oct. 31, 2018, 10 pages.
International Search Report and Written Opinion prepared by the State Intellectual Property Office of the P.R. China, as International Searching Authority for PCT International Patent Application No. PCT/CN2018/098318, dated Nov. 6, 2018, 9 pages.
U.S. Appl. No. 16/052,944, NonFinal Office Action dated Dec. 26, 2018, 23 pages.
U.S. Appl. No. 16/249,514, filed Jan. 16, 2019, 80 pages.
U.S. Appl. No. 16/279,631, filed Feb. 19, 2019, 77 pages.
U.S. Appl. No. 16/249,514, NonFinal Office Action dated Jun. 13, 2019, 23 pages.
U.S. Appl. No. 16/052,944, Final Office Action dated Jun. 17, 2019, 22 pages.
U.S. Appl. No. 16/052,974, Office Action Restriction-Requirement dated Jul. 25, 2019, 7 pages.
U.S. Appl. No. 16/249,514, Notice of Allowance dated Sep. 27, 2019, 19 pages.
U.S. Appl. No. 16/052,974, Non-Final Office Action, dated Oct. 16, 2019, 38 pages.

METHOD AND SYSTEM FOR IMPLEMENTING AUTOMATIC TRANSACTION REBROADCASTING FOR TRANSIENT BLOCKCHAINS

CROSS-REFERENCES TO RELATED APPLICATIONS

This application is a continuation-in-part application of each of: U.S. patent application Ser. No. 16/249,514 (the "'514 application"), filed Jan. 16, 2019 by David Begor Lancashire et al., entitled, "Method and System for Securing a Blockchain with Proof-of-Transactions," which is a continuation application of U.S. patent application Ser. No. 16/052,912 (the "'912 application"; now U.S. Pat. No. 10,230,530), filed Aug. 2, 2018 by David Begor Lancashire et al., entitled, "Method and System for Securing a Blockchain with Proof-of-Transactions"; U.S. patent application Ser. No. 16/052,944 (the "'944 application"), filed Aug. 2, 2018 by David Begor Lancashire, entitled, "Method and System for Securing a Blockchain with Proof-of-Transactions"; and U.S. patent application Ser. No. 16/052,974 (the "'974 application"), filed Aug. 2, 2018 by David Begor Lancashire, entitled, "Method and System for Securing a Blockchain with Proof-of-Transactions"; each of which claims priority to U.S. Patent Application Ser. No. 62/541,657 (the "'657 application"), filed Aug. 5, 2017 by David Begor Lancashire, entitled, "Method to Secure a Blockchain with Proof-of-Transactions," the disclosure of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing blockchain transactions, and, more particularly, to methods, systems, and apparatuses for implementing automatic transaction rebroadcasting for transient blockchains.

BACKGROUND

Typical or conventional blockchains, due to the nature of their permanent ledgers, will eventually increase in number to span thousands, tens of thousands, hundreds of thousands, millions, or more blocks, which would result in a number of problems or issues including, but not limited to, at least one of: a slowdown in validation of the conventional blockchains, an increase in the costs of storing such large conventional blockchains, an increase in the costs of maintaining copies of such large conventional blockchains throughout a blockchain network, an increase in the demand for processing power, an increase in the processing time, and/or the like.

Further, because typical or conventional blockchains are permanent-ledger-based blockchains rather than transient blockchains, rebroadcasting of pruned transaction slips would not even be considered for such typical or conventional blockchains.

Hence, there is a need for more robust and scalable solutions for implementing blockchain transactions, and, more particularly, to methods, systems, and apparatuses for implementing automatic transaction rebroadcasting for transient blockchains.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
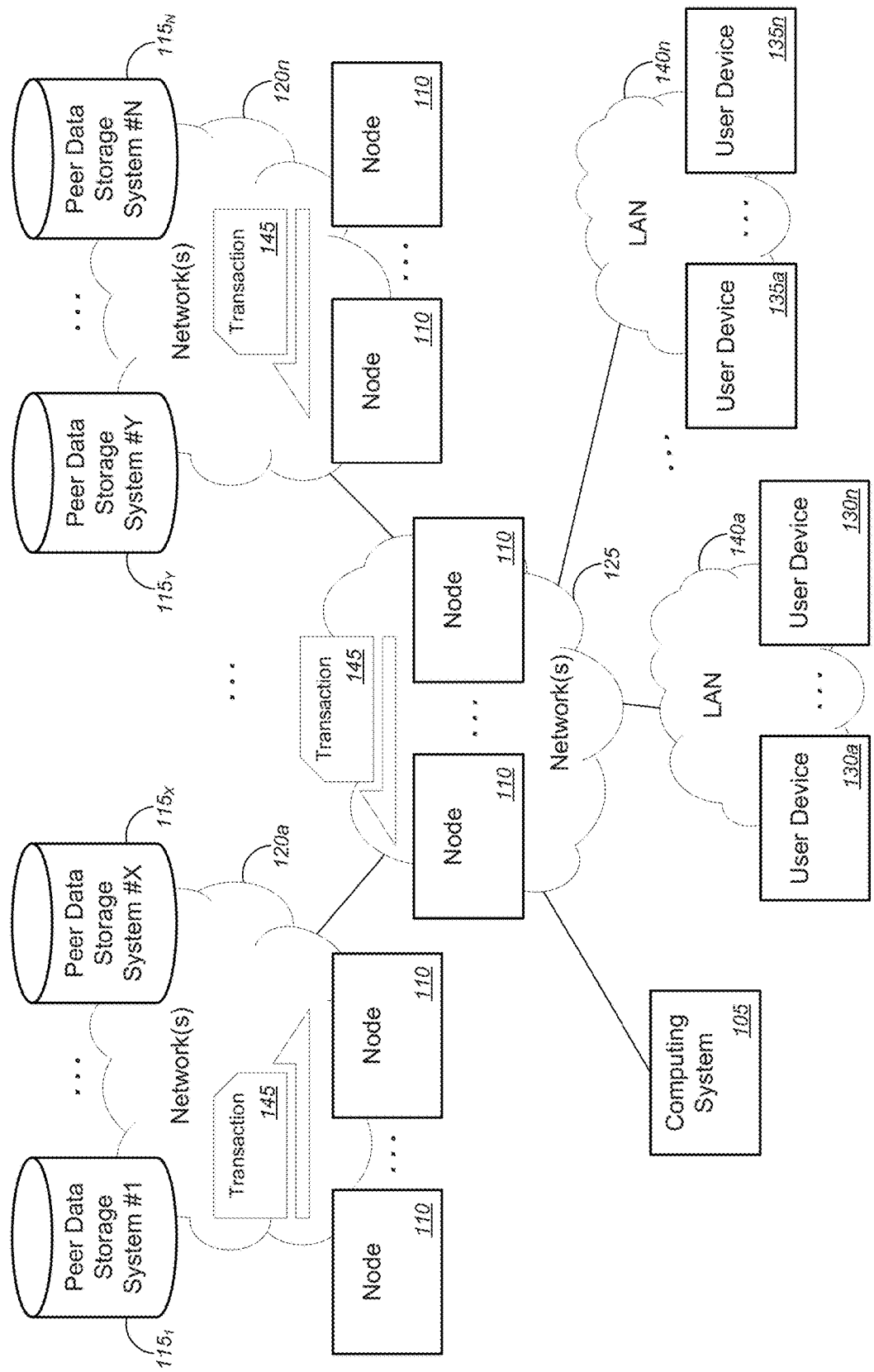
FIG. 1 is a schematic diagram illustrating a system for implementing automatic transaction rebroadcasting for transient blockchains, in accordance with various embodiments.

Various embodiments provide tools and techniques for implementing blockchain transactions, and, more particularly, to methods, systems, and apparatuses for implementing automatic transaction rebroadcasting for transient blockchains.

In various embodiments, a first node among a plurality of nodes in a peer-to-peer blockchain network might identify at least one of one or more transactions or one or more transaction slips in at least one block preceding an identified block in a blockchain. The first node might determine whether each of the identified at least one of the one or more transactions or the one or more transaction slips satisfies one or more criteria for rebroadcasting. Based on a determination that at least one transaction or at least one transaction slip among the identified at least one of the one or more transactions or the one or more transaction slips satisfies the one or more criteria for rebroadcasting, the first node might re-include the at least one transaction or the at least one transaction slip in a subsequent candidate block that is produced and offered to one or more other nodes among the plurality of nodes in the peer-to-peer blockchain network for validation and inclusion in the blockchain.

Herein, "re-including" might refer to transactions or transaction slips being inserted into a candidate block, which is then produced and offered to peer nodes in the blockchain network for validation and inclusion in the blockchain (where, in such validation process, the candidate block either may be deemed valid and subsequently included in the blockchain, or may be deemed invalid and not included in the blockchain), while "rebroadcasting" might refer to transactions or transaction slips being inserted into candidate blocks that have been deemed valid and have been included in the blockchain by the peer nodes.

In general, to address the problems or issues with typical or conventional blockchains or blockchain systems, the blockchain system in accordance with various embodiments might utilize transient blockchain functionality, which might include pruning, dropping, or pushing off one or more older blocks within the transient blockchain. In some cases, the one or more older blocks being pruned, dropped, or pushed off might precede an identified block in the transient blockchain. According to some embodiments, although not shown, the blocks preceding the identified block might number one of at least 10000 blocks, at least 50000 blocks, or at least 100000 blocks, or more blocks, and the like.

While transient blockchains address the problems or issues of typical or conventional blockchains, blocks that have been pruned, dropped, or pushed off might contain one or more transaction slips that should not be lost (or deleted) or that might otherwise satisfy criteria for rebroadcasting. In some embodiments, the criteria for rebroadcasting might include, without limitation, at least one of whether transactions or transaction slips have been spent, whether data associated with a transaction is of a predetermined size, whether transaction slips are addressed to one or more specific addresses, whether transaction slips contain more than a set number of tokens, whether transaction slips contain unspent tokens having a value greater than a predetermined amount or an amount specified in consensus rules of the blockchain, whether transactions are associated with credit stored elsewhere in the blockchain that may be deducted to pay an associated fee, or whether a transaction containing transaction slips is one of a specific type of transaction including, but not limited to, one of a golden ticket transaction, a VIP transaction, or a normal transaction, and/or the like.

The various embodiments might further provide a method to secure a cryptocurrency that avoids a "free-rider" economic problem that affects many cryptocurrencies and hurts their ability to scale. The embodiments described herein solve this problem by utilizing a new security method (namely, "proof-of-transactions") based on a multi-player voting system that is not susceptible to this free-rider problem and allows a cryptocurrency network to divide its revenue between the set of nodes in the peer-to-peer network that provides bandwidth and connectivity and a separate set of nodes, the role of which is to safeguard the security of the system. By enabling a cryptocurrency network to reward nodes that contribute bandwidth and connectivity to the network in addition to those that ensure the security of block issuance, the various embodiments allow cryptocurrencies to increase the amount of data processed by the network in an economically-efficient manner. This permits the development of fundamentally new applications, including, but not limited to, secure but decentralized email services, peer-to-peer social networks, pay-to-play websites, secure data-routing networks, SSH-key registries that are safe from man-in-the-middle ("MITM") attacks, and/or the like.

Given the importance of blockchain technology and the need for more effective ways to scale up these networks to handle massive amounts of data, the importance of the various embodiments lies in the way they offer a simple and elegant solution to the free-rider problem, by outlining an unintuitive method for securing a blockchain (i.e., a proof-of-transactions approach) that enables network fees to be used to compensate both the nodes that provide security in the system as well as the nodes that form the backbone of the peer-to-peer network. While the voting method described here can be generalized to divide payments between any number of classes of actors in a blockchain network, simply by extending the voting process so that all actors are required to vote to approve changes to network consensus, in the description below we focus on a system with only two types of nodes (namely, "nodes" and "miners") as these best describe the current needs of blockchain systems. And our method has many unexpected virtues: allocating fees between these classes of nodes in a transparent way that responds in real-time to the market-driven demands of the applications on the network for more bandwidth or security respectively.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, blockchain technology, and/or the like. In other aspects, certain embodiments, can improve the functioning of user equipment or systems themselves (e.g., blockchain network nodes, blockchain network infrastructure, etc.), for example, by utilizing transient blockchain technology with automatic transaction rebroadcasting on transient blockchain to address the problems or issues with blockchains having permanent ledgers—including, but not limited to, a slowdown in validation of the conventional blockchains, an increase in the costs of storing such large conventional blockchains, an increase in the costs of maintaining copies of such large conventional blockchains throughout a blockchain network, an increase in the demand for processing power, an increase in the processing time, and/or the like.

In particular, to the extent any abstract concepts are present in the various embodiments, those concepts can be implemented as described herein by devices, software, systems, and methods that involve specific novel functionality (e.g., steps or operations), such as, identifying, with a first node among a plurality of nodes in a peer-to-peer blockchain network, at least one of one or more transactions or one or more transaction slips in at least one block preceding an identified block in a blockchain; determining, with the first node, whether each of the identified at least one of the one or more transactions or the one or more transaction slips satisfies one or more criteria for rebroadcasting; and based on a determination that at least one transaction or at least one transaction slip among the identified at least one of the one or more transactions or the one or more transaction slips satisfies the one or more criteria for rebroadcasting, re-including, with the first node, the at least one transaction or the at least one transaction slip in a subsequent candidate block that is produced and offered to one or more other nodes among the plurality of nodes in the peer-to-peer blockchain network for validation and inclusion in the blockchain; and/or the like, to name a few examples, that extend beyond mere conventional computer processing operations. These functionalities can produce tangible results outside of the implementing computer system, including, merely by way of example, optimized functionality of blockchain networks (including, but not limited to, transient blockchains with automatic transaction rebroadcasting on transient blockchain) regardless of the number of transactions or blocks in any particular blockchain, and over decades of operation, and/or the like, at least some of which may be observed or measured by users and/or service providers (including miners, nodes, and/or the like).

In an aspect, a method might comprise identifying, with a first node among a plurality of nodes in a peer-to-peer blockchain network, at least one of one or more transactions or one or more transaction slips in at least one block preceding an identified block in a blockchain; determining, with the first node, whether each of the identified at least one of the one or more transactions or the one or more transaction slips satisfies one or more criteria for rebroadcasting; and based on a determination that at least one transaction or at least one transaction slip among the identified at least one of the one or more transactions or the one or more transaction slips satisfies the one or more criteria for rebroadcasting, re-including, with the first node, the at least one transaction or the at least one transaction slip in a subsequent candidate block that is produced and offered to one or more other nodes among the plurality of nodes in the peer-to-peer blockchain network for validation and inclusion in the blockchain.

In some embodiments, the method might further comprise pruning, by at least one second node among the plurality of nodes in the peer-to-peer blockchain network, at least one block from the blockchain that has one or more transactions or one or more transaction slips rebroadcast or re-included in at least one subsequent block in the blockchain, to prevent the one or more transactions or the one or more transaction slips in the at least one block from being available as duplicate transactions or transaction slips that can be spent. In some cases, pruning of the at least one block may be performed during one of before the one or more transactions or the one or more transaction slips in the at least one block have been rebroadcast or re-included in at least one subsequent block in the blockchain, simultaneous with the one or more transactions or the one or more transaction slips in the at least one block being rebroadcast or re-included in at least one subsequent block in the blockchain, or after the one or more transactions or the one or more transaction slips in the at least one block have been rebroadcast or re-included in at least one subsequent block in the blockchain, or the like.

According to some embodiments, the method might further comprise determining, with at least one third node among the plurality of nodes in the peer-to-peer blockchain network, whether a candidate block fails one or more second criteria based on consensus rules of the blockchain, the one or more second criteria comprising at least one of that a candidate block must contain all rebroadcast data that the one or more criteria for rebroadcasting require to be included in a block, that a candidate block must contain accurate rebroadcast data, and that a candidate block must not contain additional rebroadcast data that is not eligible for rebroadcasting according to the one or more criteria for rebroadcasting; and based on a determination that the candidate block fails one or more second criteria, designating, with the at least one third node, that the candidate block is deemed an invalid candidate block for inclusion in the blockchain.

In some embodiments, the method might further comprise determining a frequency at which at least one fourth node among the plurality of nodes in the peer-to-peer blockchain network performs at least one of transaction rebroadcasting or block pruning, using at least one of a predetermined sequence of integers or a deterministic function that generates the predetermined sequence of integers, wherein each integer in the predetermined sequence of integers represents every $N^{th}$ block whose generation triggers the at least one of transaction rebroadcasting or block pruning; and performing, with the at least one fourth node, the at least one of transaction rebroadcasting or block pruning, based on the determined frequency.

Merely by way of example, in some cases, the one or more criteria for rebroadcasting transactions or transaction slips might comprise at least one of whether a transaction or a transaction slip has been spent, whether data associated with a transaction is of a predetermined size, whether a transaction slip is addressed to one or more specific addresses, whether a transaction slip contains more than a set number of tokens, whether a transaction slip contains unspent tokens having a value greater than an amount specified in consensus rules of the blockchain, whether a transaction is associated with credit stored elsewhere in the blockchain that may be deducted to pay an associated fee, or whether a transaction or its associated transaction slip is one of a specific type of transaction including one of a golden ticket transaction, a VIP transaction, or a normal transaction, and/or the like.

According to some embodiments, re-including, with the first node, the at least one transaction or the at least one transaction slip in a subsequent candidate block might comprise creating one or more of at least one new transaction or at least one new transaction slip that re-formats rebroadcast data in accordance with consensus rules of the blockchain, wherein each new transaction or each new transaction slip among the one or more of the at least one new transaction or the at least one new transaction slip contains a variable that flags each new transaction as a rebroadcast transaction or a variable that flags each new transaction slip as a rebroadcast transaction slip. In some cases, each new transaction slip that is rebroadcast might be attached to each corresponding new transaction as spendable outputs to said new transaction. In some instances, the method might further comprise determining whether a rebroadcast transaction among the at least one rebroadcast transaction fails at least one of an initial validation check as the rebroadcast transaction is no longer signed by an original transaction originator or a requirement that the rebroadcast transaction must have adequate inputs to pay for its outputs; based on a determination that the rebroadcast transaction fails at least one of the initial validation check as the rebroadcast transaction is no longer signed by an original transaction originator or the requirement that the rebroadcast transaction must have adequate inputs to pay for its outputs, determining whether the rebroadcast transaction qualifies as a properly formatted rebroadcast transaction, based on one or more third criteria for transaction validity defined in consensus rules of the blockchain; and based on a determination that the rebroadcast transaction qualifies as a properly formatted rebroadcast transaction, designating the rebroadcast transaction as a valid rebroadcast transaction.

In some cases, re-including, with the first node, the at least one transaction or the at least one transaction slip in a subsequent candidate block might comprise re-including, with the first node and in a subsequent candidate block, the at least one transaction or the at least one transaction slip together with other data that is initially associated with or attached to an original transaction from which the rebroadcast transaction is sourced, wherein the at least transaction or the at least one transaction slip and the other data might be sufficient to enable at least partial reconstruction of the original transaction, regardless of whether the original transaction has been pruned from the blockchain.

In some instances, the method might further comprise determining whether any credit associated with data contained in at least one unspent transaction slip or transaction remains; and based on a determination that some credit associated with data contained in the at least one unspent transaction slip or transaction remains, using at least a portion of the remaining credit to pay for rebroadcasting of the at least one unspent transaction slip or transaction in a subsequent block of the blockchain, and reducing the amount of the remaining credit available in the rebroadcast transaction slip or transaction.

In some embodiments, the method might further comprise adding, to the rebroadcast at least one transaction, ancillary data that is generated by consensus rules of the blockchain, the ancillary data comprising at least one of a variable that stores information regarding a number of times that a transaction or its corresponding transaction slip has been rebroadcast, a type of rebroadcast fee that has been applied, or additional cryptographic signatures that can be used to reconstruct an original transaction from which the rebroadcast at least one transaction is sourced, and/or the like.

In some cases, the re-included at least one transaction or the re-included at least one transaction slip has a data structure comprising at least one of payment information, ancillary block data, rebroadcast request field, data that is validated in rebroadcast, or a cryptographic signature, and/or the like. In some instances, at least one of credit or data that is originally associated with an original transaction or an original transaction slip included in a blockchain might be stored in an ancillary data structure, wherein the ancillary data structure might comprise at least one of a database or an in-memory data table, and/or the like, and wherein the data that is stored in this ancillary data structure might be updated during the process of transaction rebroadcasting.

According to some embodiments, a fee paid for rebroadcasting transactions or transaction slips might be added to revenue paid to a block producer as part of compensation that block producers receive for operating the blockchain network. Alternatively, or additionally, a fee paid for rebroadcasting transactions or transaction slips might be added to a treasury of the blockchain and released slowly over time to the blockchain network as a coinbase reward to the blockchain network that pays for network operations without all revenues going directly to a producer of a block that contains the rebroadcast transactions or transaction slips. Alternatively, or additionally, a fee paid for rebroadcasting transactions or transaction slips might be determined dynamically to cost a multiple of a fee paid for new transactions included in blocks of the blockchain network (e.g., two times or three times the fee paid, etc.). Alternatively, or additionally, a fee paid for rebroadcasting transactions or transaction slips might be increased with every additional rebroadcasting. Alternatively, or additionally, a fee paid for rebroadcasting transactions or transaction slips might be determined according to at least one of a size of data that is already stored on the blockchain or space that is available for new transactions or transaction slips. Alternatively, or additionally, different fee multipliers might be applied to rebroadcasting of transactions or transaction slips.

In some embodiments, the method might further comprise providing users who originate transactions with one or more of an option to designate one or more data in at least one transaction as data that should not be rebroadcast, an option to designate one or more transactions as transactions that should not be rebroadcast, or an option to designate one or more transaction slips as transaction slips that should not be rebroadcast, and/or the like.

In another aspect, a node among a plurality of nodes might be provided in a peer-to-peer blockchain network. The node might comprise at least one processor and a non-transitory computer readable medium communicatively coupled to the at least one processor. The non-transitory computer readable medium might have stored thereon computer software comprising a set of instructions that, when executed by the at least one processor, causes the node to: identify at least one of one or more transactions or one or more transaction slips in at least one block preceding an identified block in a blockchain; determine whether each of the identified at least one of the one or more transactions or the one or more transaction slips satisfies one or more criteria for rebroadcasting; and based on a determination that at least one transaction or at least one transaction slip among the identified at least one of the one or more transactions or the one or more transaction slips satisfies the one or more criteria for rebroadcasting, re-include the at least one transaction or the at least one transaction slip in a subsequent candidate block that is produced and offered to one or more other nodes among the plurality of nodes in the peer-to-peer blockchain network for validation and inclusion in the blockchain.

In yet another aspect, a system might comprise a node among a plurality of nodes in a peer-to-peer blockchain network. The node might comprise at least one processor and a non-transitory computer readable medium communicatively coupled to the at least one processor. The non-transitory computer readable medium might have stored thereon computer software comprising a set of instructions that, when executed by the at least one processor, causes the node to: identify at least one of one or more transactions or one or more transaction slips in at least one block preceding an identified block in a blockchain; determine whether each of the identified at least one of the one or more transactions or the one or more transaction slips satisfies one or more criteria for rebroadcasting; and based on a determination that at least one transaction or at least one transaction slip among the identified at least one of the one or more transactions or the one or more transaction slips satisfies the one or more criteria for rebroadcasting, re-include the at least one transaction or the at least one transaction slip in a subsequent candidate block that is produced and offered to one or more other nodes among the plurality of nodes in the peer-to-peer blockchain network for validation and inclusion in the blockchain.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-8 illustrate some of the features of the method, system, and apparatus for implementing blockchain transactions, and, more particularly, to methods, systems, and apparatuses for implementing automatic transaction rebroadcasting for transient blockchains, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

With reference to the figures, FIG. 1 is a schematic diagram illustrating a system 100 for implementing automatic transaction rebroadcasting for transient blockchains, in accordance with various embodiments.

In the non-limiting embodiment of FIG. 1, system 100 might comprise a computing system 105, which might include, without limitation, one of a processor on a user device, a network node, a high speed signing network card(s), a network interface device, a server computer, a cloud-based computing system, a distributed computing system, and/or the like. System 100 might further comprise a plurality of nodes 110 and a plurality of peer data storage systems $115_1$-$115_X$ and $115_Y$-$115_N$ (collectively, "peer data storage systems 115," "data storage 115," or the like), both distributed across a plurality of networks 120a-120n (collectively, "networks 120" or the like). As shown in FIG. 1, for example, distributed peer data storage systems #1 $115_1$ through #X $115_X$ might be disposed in one or more networks 120a, while distributed peer data storage systems #Y $115_Y$ through #N $115_N$ might be disposed in one or more networks 120n. Although not shown, distributed peer data storage systems #X+1 $115_{X+1}$ through #Y-1 $115_{Y-1}$ (as well as other nodes 110) might be disposed in one or more networks 120b through 120n-1. In some cases, each distributed peer storage system 115 might comprise a database, and in some cases, a local server or local computing system that accesses the database in response to requests from external or remote computing systems (e.g., computing system 105, nodes 110, user devices, or the like). In some embodiments, computing system 105 might communicatively couple with one or more of the distributed peer data storage systems 115 in networks 120 via one or more networks 125. In some cases, at least some of the plurality of nodes 110 might also be disposed in the one or more networks 125. System 100 might further comprise one or more user devices 130a-130n and 135a-135n (collectively, "user devices," "user devices 130," or "user devices 135," or the like) disposed in one or more local area networks ("LANs") 140a-140n (collectively, "LANs 140" or the like). The user devices might be associated with users who might initiate or participate in transactions 145, which when validated or confirmed might be incorporated in one or more blocks in a blockchain. In some embodiments (as described below), a user associated with one of the user devices might participate in a three-party activity with a miner (which solves computational puzzles in the golden ticket) and a node (which provides bandwidth and connectivity for the transactions), by being provided with the capability to tag their transactions with an optional paysplit vote (which the system 100 or the network might require might only be included if the votes are aligned in the same direction rather than conflicting).

According to some embodiments, networks 120a-120n and 125 might each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider and/or the Internet.

In operation, a first node 110 among a plurality of nodes 110 in the peer-to-peer blockchain network 100 might identify at least one of one or more transactions or one or more transaction slips in at least one block preceding an identified block in a blockchain. The first node 110 might determine whether each of the identified at least one of the one or more transactions or the one or more transaction slips satisfies one or more criteria for rebroadcasting. Based on a determination that at least one transaction or at least one transaction slip among the identified at least one of the one or more transactions or the one or more transaction slips satisfies the one or more criteria for rebroadcasting, the first node 110 might re-include the at least one transaction or the at least one transaction slip in a subsequent candidate block that is produced and offered to one or more other nodes among the plurality of nodes in the peer-to-peer blockchain network for validation and inclusion in the blockchain. Herein, "re-including" might refer to transactions or transaction slips being inserted into a candidate block, which is then produced and offered to peer nodes in the blockchain network for validation and inclusion in the blockchain (where, in such validation process, the candidate block either may be deemed valid and subsequently included in the blockchain, or may be deemed invalid and not included in the blockchain), while "rebroadcasting" might refer to transactions or transaction slips being inserted into candidate blocks that have been deemed valid and have been included in the blockchain by the peer nodes.

According to some embodiments, the one or more criteria for rebroadcasting transactions or transaction slips might include, without limitation, at least one of whether a transaction or a transaction slip has been spent, whether data associated with a transaction is of a predetermined size, whether a transaction slip is addressed to one or more specific addresses, whether a transaction slip contains more than a set number of tokens, whether a transaction slip contains unspent tokens having a value greater than an amount specified in consensus rules of the blockchain, whether a transaction is associated with credit stored elsewhere in the blockchain that may be deducted to pay an associated fee, or whether a transaction or its associated transaction slip is one of a specific type of transaction including one of a golden ticket transaction, a VIP transaction, or a normal transaction, and/or the like.

In some embodiments, at least one second node 110 among the plurality of nodes 110 in the peer-to-peer blockchain network 100 might prune at least one block from the blockchain that has one or more transactions or one or more transaction slips rebroadcast or re-included in at least one subsequent block in the blockchain, to prevent the one or more transactions or the one or more transaction slips in the at least one block from being available as duplicate transactions or transaction slips that can be spent. In other words, the at least one block is pruned from the blockchain, such that the original copies of the transaction slips (or transaction) are no longer eligible to be spent once the rebroadcast copies of the transaction slips (or transaction) have been included in the blockchain (or have been re-included in a candidate block for validation and inclusion in the blockchain), and the rebroadcast transactions (or transaction slips) do not need to be stored in duplicate by the nodes in the peer-to-peer blockchain network.

In some cases, pruning of the at least one block may be performed during one of: (1) before the one or more transactions or the one or more transaction slips in the at least one block have been rebroadcast or re-included in at least one subsequent block in the blockchain; (2) simultaneous (or concurrent) with the one or more transactions or the one or more transaction slips in the at least one block being rebroadcast or re-included in at least one subsequent block in the blockchain; or (3) after the one or more transactions or the one or more transaction slips in the at least one block have been rebroadcast or re-included in at least one subsequent block in the blockchain; and/or the like. In other words, one approach might be to prune or delete the old block after receiving a new block that has the rebroadcast transactions that makes the earlier transactions unspendable. Alternatively, the old block may be removed before the transactions are rebroadcast, with the removed block being kept saved but not spendable for a block, and the transactions may subsequently be rebroadcast from that old block to the new block in the blockchain (in some cases, at the front of the blockchain or the like) as part of the subsequent block. That is, a single block is kept in limbo, with its slips unspent and awaiting rebroadcast, but not manually spendable. In some cases, such as where duplicate transactions or transaction slips may simultaneously exist in both the old block and the new block in the blockchain, the latter approach can enable one to see what transactions need rebroadcasting, as the block producers do not need to compare the contents of the block they are generating (i.e., in the new block) with the contents being rebroadcast (i.e., from the old block) to be sure that none of the rebroadcast slips were actually spent in the new block.

According to some embodiments, at least one third node 110 among the plurality of nodes 110 in the peer-to-peer blockchain network 100 might determine whether a candidate block fails one or more second criteria based on consensus rules of the blockchain. The one or more second criteria might include, but is not limited to, at least one of that a candidate block must contain all rebroadcast data that the one or more criteria for rebroadcasting require to be included in a block, that a candidate block must contain accurate rebroadcast data, and that a candidate block must not contain additional rebroadcast data that is not eligible for rebroadcasting according to the one or more criteria for rebroadcasting, and/or the like. Based on a determination that the candidate block fails one or more second criteria, the at least one third node 110 might designate that the candidate block is deemed an invalid candidate block for inclusion in the blockchain. In other words, the at least one third node 110 might enforce, via the consensus rules of the blockchain, that any candidate block that does not contain all of the rebroadcast data that the one or more criterial for rebroadcasting dictate should be included in a block, that any candidate block that contains inaccurate rebroadcast data, or that any candidate block that contains additional rebroadcast data that is not eligible for rebroadcasting according to the one or more criteria for rebroadcasting, and/or the like, is deemed an invalid candidate block for inclusion in the blockchain.

In some embodiments, the computing system 105 or at least one of the nodes 110 might determine a frequency at which at least one fourth node 110 among the plurality of nodes 110 in the peer-to-peer blockchain network 100 performs at least one of transaction rebroadcasting or block pruning, using at least one of a predetermined sequence of integers or a deterministic function that generates the predetermined sequence of integers, and/or the like. In some instances, each integer in the predetermined sequence of integers might represent every $N^{th}$ block whose generation triggers the at least one of transaction rebroadcasting or block pruning. In other words, the computing system 105 or the at least one of the nodes 110 can use a predetermined sequence of integers or a deterministic function that generates such integers to determine the frequency at which transaction rebroadcasting and/or block pruning is carried out by the nodes in the network (e.g., at least one fourth node 110), such that the production of every $N^{th}$ block in the blockchain would trigger the process of transaction rebroadcasting and re-inclusion (and/or would trigger the process of block pruning).

According to some embodiments, re-including, with the first node 110, the at least one transaction or the at least one transaction slip in a subsequent candidate block might comprise creating one or more of at least one new transaction or at least one new transaction slip that re-formats rebroadcast data in accordance with consensus rules of the blockchain. Each new transaction or each new transaction slip among the one or more of the at least one new transaction or the at least one new transaction slip might contain a variable that flags each new transaction as a rebroadcast transaction or a variable that flags each new transaction slip as a rebroadcast transaction slip. In other words, the node that rebroadcasts a transaction slip (or transaction) does so by creating a new transaction slip (or a new transaction) that re-formats the rebroadcast data according to a method defined by the consensus rules of the blockchain, such that the other nodes 110 of the peer-to-peer blockchain network 100 can identify these rebroadcast transaction slips as a unique class of transaction slip (or identify these rebroadcast transactions as a unique class of transaction), such as by defining a variable in the transaction slip (or transaction) that flags that this is a rebroadcast transaction slip (or rebroadcast transaction).

In some cases, each new transaction slip that is rebroadcast might be attached to each corresponding new transaction as spendable outputs to said new transaction. In some instances, the computing system 105 or at least one of the nodes 110 might determine whether a rebroadcast transaction among the at least one rebroadcast transaction fails at least one of an initial validation check as the rebroadcast transaction is no longer signed by an original transaction originator or a requirement that the rebroadcast transaction must have adequate inputs to pay for its outputs. Based on a determination that the rebroadcast transaction fails at least one of the initial validation check as the rebroadcast transaction is no longer signed by an original transaction originator or the requirement that the rebroadcast transaction must have adequate inputs to pay for its outputs, the computing system 105 or at least one of the nodes 110 might determine whether the rebroadcast transaction qualifies as a properly formatted rebroadcast transaction, based on one or more third criteria for transaction validity defined in consensus rules of the blockchain. Based on a determination that the rebroadcast transaction qualifies as a properly formatted rebroadcast transaction, the computing system 105 or at least one of the nodes 110 might designate the rebroadcast transaction as a valid rebroadcast transaction. In other words, the consensus rules that validate transactions in the blockchain might add a secondary check to the transaction validation process that require that the rebroadcast transactions—which fail the initial validation check as they are no longer signed by the original transaction originator or which fail to have adequate inputs to pay for their outputs—should be examined to see if they qualify as properly formatted rebroadcast transactions and are deemed valid if they meet the criteria for transaction validity defined in the consensus rules of the blockchain.

In some embodiments, re-including, with the first node 110, the at least one transaction or the at least one transaction slip in a subsequent candidate block might comprise re-including, with the first node 110 and in a subsequent candidate block, the at least one transaction or the at least one transaction slip together with other data that is initially associated with or attached to an original transaction from which the rebroadcast transaction is sourced, where the at least transaction or the at least one transaction slip and the other data are sufficient to enable at least partial reconstruction of the original transaction, regardless of whether the original transaction has been pruned from the blockchain. In other words, in addition to the rebroadcasting of the core transaction or transaction slip data, other data initially associated with or attached to the transaction from which the rebroadcast transaction is sourced is also rebroadcast when the transaction slip is re-included in the blockchain, such that at least parts of the original transaction may be reconstructed from knowledge of the rebroadcast transaction even if the original transaction is no longer a required component of the overall blockchain.

According to some embodiments, the computing system 105 or at least one of the nodes 110 might determine whether any credit associated with data contained in at least one unspent transaction slip or transaction remains. Based on a determination that some credit associated with data contained in the at least one unspent transaction slip or transaction remains, the computing system 105 or at least one of the nodes 110 might use at least a portion of the remaining credit to pay for rebroadcasting of the at least one unspent transaction slip or transaction in a subsequent block of the blockchain, and might reduce the amount of the remaining credit available in the rebroadcast transaction slip or transaction.

In some embodiments, the computing system 105 or at least one of the nodes 110 might add, to the rebroadcast at least one transaction, ancillary data that is generated by consensus rules of the blockchain. The ancillary data might include, without limitation, at least one of a variable that stores information regarding a number of times that a transaction or its corresponding transaction slip has been rebroadcast, a type of rebroadcast fee that has been applied, or additional cryptographic signatures that can be used to reconstruct an original transaction from which the rebroadcast at least one transaction is sourced, and/or the like. In other words, ancillary data may be added to the rebroadcast transaction that is re-included in the blockchain that is generated by the consensus layer code in the blockchain, such as a variable that stores information on the number of times that the transaction or its slips have been rebroadcast, the type of rebroadcast fee that has been applied, or additional cryptographic signatures that can be used to reconstruct the original transaction, etc.

In some cases, the re-included at least one transaction or the re-included at least one transaction slip has a data structure including, but not limited to, at least one of payment information, ancillary block data, rebroadcast request field, data that is validated in rebroadcast, or a cryptographic signature, and/or the like. In some instances, at least one of credit or data that is originally associated with an original transaction or an original transaction slip included in a blockchain is stored in an ancillary data structure, where the ancillary data structure might include, without limitation, at least one of a database or an in-memory data table, and/or the like. The data that is stored in this ancillary data structure may be updated during the process of transaction rebroadcasting. In other words, the credit and/or data that is originally associated with an original transaction or transaction slip may be stored in an ancillary data structure, such that the rebroadcasting mechanism serves as a bookkeeping mechanism that synchronizes and regulates the process of updating the ancillary data structure rather than a method of producing new transactions or transaction slips that are spent directly by users when making transactions on the blockchain network.

According to some embodiments, a fee paid for rebroadcasting transactions or transaction slips might be added to revenue paid to a block producer as part of compensation that block producers receive for operating the blockchain network. Alternatively, or additionally, a fee paid for rebroadcasting transactions or transaction slips might be added to a treasury of the blockchain and released slowly over time to the blockchain network as a coinbase reward to the blockchain network that pays for network operations without all revenues going directly to a producer of a block that contains the rebroadcast transactions or transaction slips. Alternatively, or additionally, a fee paid for rebroadcasting transactions or transaction slips might be determined dynamically to cost a multiple of a fee paid for new transactions included in blocks of the blockchain network (e.g., two times or three times the fee paid, etc.), or to cost more than the fee paid for new transactions (i.e., greater than the fee paid, but not necessarily in integer multiples of the fee paid, or the like). Alternatively, or additionally, a fee paid for rebroadcasting transactions or transaction slips might be increased with every additional rebroadcasting (e.g., with every additional loop that these transactions make through the transient blockchain rebroadcasting process, or the like). Alternatively, or additionally, a fee paid for rebroadcasting transactions or transaction slips might be determined according to at least one of a size of data that is already stored on the blockchain or space that is available for new transactions or transaction slips. In this way, by determining the fee according to size of the data that is already stored on the blockchain or according to the available space for new transactions, rather than as a multiple of the average fee, the consensus layer of the blockchain can prevent the blockchain from growing out of bounds. Alternatively, or additionally, different fee multipliers might be applied to rebroadcasting of transactions or transaction slips.

In some embodiments, the computing system 105 or at least one of the nodes 110 might provide users who originate transactions with one or more of an option to designate one or more data in at least one transaction as data that should not be rebroadcast, an option to designate one or more transactions as transactions that should not be rebroadcast, or an option to designate one or more transaction slips as transaction slips that should not be rebroadcast, and/or the like. In other words, users who originate transactions may specify that they do not wish any data associated with their transaction to be rebroadcast, or that they do not wish their transactions or transaction slips to be rebroadcast.

Merely by way of example, in some instances, two or more of the at least one first node, the at least one second node, the at least one third node, the at least one fourth node, or the at least one of the nodes might be the same node or nodes 110 among the plurality of nodes 110 in the peer-to-peer blockchain network 100. Alternatively, the at least one first node, the at least one second node, the at least one third node, the at least one fourth node, and the at least one of the nodes might be different nodes in the peer-to-peer blockchain network 100.

In an alternative set of embodiments, a first node 110 among the plurality of nodes 110 in the peer-to-peer blockchain network 100 (which may or may not be the same node as the first node 110 described with respect to the embodiments above) might identify one or more unspent transaction slips (which might be based on one of the transactions 145) in at least one unpruned block preceding an identified block in a blockchain. The first node 110 might determine whether each of the identified one or more unspent transaction slips satisfies one or more criteria for rebroadcasting. Based on a determination that at least one unspent transaction slip among the identified one or more unspent transaction slips satisfies the one or more criteria for rebroadcasting, the first node 110 might rebroadcast the at least one unspent transaction slip in a subsequent block that is produced and validated by the blockchain network.

According to some embodiments, the one or more criteria for rebroadcasting the at least one unspent transaction slip might include, without limitation, at least one of whether transaction slips have been spent, whether transaction slips are addressed to one or more specific addresses, whether transaction slips contain more than a set number of tokens, whether transaction slips contain unspent tokens having a value greater than a predetermined amount, or whether a transaction containing transaction slips is of a type comprising one of a golden ticket transaction, a VIP transaction, or a normal transaction, and/or the like. In some instances, the at least one unspent transaction slip might have a data structure including, but not limited to, at least one of payment information, ancillary block data, rebroadcast request field, data that is validated in rebroadcast, or a cryptographic signature, and/or the like.

In some embodiments, based on a determination that at least one unspent transaction slip among the identified one or more unspent transaction slips satisfies the one or more criteria for rebroadcasting, the first node 110 might parse the at least one unspent transaction slip from other data contained in the at least one unpruned block. In such instances, rebroadcasting the at least one unspent transaction slip in the subsequent block that is produced and validated by the blockchain network might comprise rebroadcasting the parsed at least one unspent transaction slip in the subsequent block that is produced and validated by the blockchain network.

According to some embodiments, the first node 110 might prune the at least one unpruned block from the blockchain concurrent with or prior to rebroadcasting the at least one unspent transaction slip in the subsequent block. In some cases, the at least one unpruned block might include, without limitation, the at least one unspent transaction slip and at least one spent transaction slip, where the at least one spent transaction slip is pruned along with the at least one unpruned block and is not rebroadcast.

In some embodiments, the first node 110 might prune one or more random blocks in the blockchain preceding the identified block concurrent with or prior to rebroadcasting the at least one unspent transaction slip in the subsequent block. Alternatively, the first node 110 might prune every $N^{th}$ block in the blockchain preceding the identified block concurrent with or prior to rebroadcasting the at least one unspent transaction slip in the subsequent block, where N is equal to a predetermined integer value or to any suitable integer value. Alternatively, the first node 110 might prune all blocks in the blockchain preceding the identified block concurrent with or prior to rebroadcasting the at least one unspent transaction slip in the subsequent block. In some instances, the blocks preceding the identified block might number one of at least 10000 blocks, at least 50000 blocks, or at least 100000 blocks, and/or the like.

According to some embodiments, rebroadcasting the at least one unspent transaction slip in the subsequent block that is produced and validated by the blockchain network might comprise rebroadcasting at least one of transaction-level data or slip-level data associated with the at least one unspent transaction slip in the subsequent block that is produced and validated by the blockchain network.

In some embodiments, the first node 110, the computing system 105, and/or the like might determine whether any credit associated with data contained in the at least one unspent transaction slip remains. Based on a determination that some credit associated with data contained in the at least one unspent transaction slip remains, the first node 110, the computing system 105, and/or the like might use at least a portion of the remaining credit to pay for the rebroadcasting of the at least one unspent transaction slip in the subsequent block.

The various embodiments offer a novel way to provide data persistence on transient blockchains. The solution is simple but counterintuitive: transaction rebroadcasting is triggered and enforced by the consensus layer of the blockchain, which might be defined by code that is shared between the nodes of the blockchain network that define what constitutes valid blocks and transactions. In doing so, this method permits a transient blockchain to process vastly more data than a blockchain with a permanent ledger, while also providing a measure of security for the tokens on the blockchain, which cannot be forced off the end of the blockchain through short-term censorship attacks. In doing so, this method increases the utility of transient blockchains and pushes them towards networks which can handle both large amounts of non-persistent data, as well as high-value persistent content like smart contracts and tokens.

Using a transient ledger has significant advantages for scalable blockchains. One advantage is that nodes in the peer-to-peer network that validate transactions and produce blocks do not need to store the entire historical ledger and transaction set. This permits the blockchain to process far more transactions per second than is possible otherwise.

A transient blockchain also permits the network to properly price the cost of processing data and ensures that the nodes which are accepting payments in exchange for this service are themselves exposed to the full cost of doing so. This prevents the blockchain from collapsing over time and solves both the "tragedy-of-the-commons" and "free-rider" problems inherent with misplacing transactions on non-transient blockchains.

A major trade-off that blockchains face with the embrace of a transient ledger is the loss of token persistence. Rather than remaining ever-accessible to spend, tokens on a transient ledger themselves become transient, and eventually become unspendable. Smart contracts are also less viable on traditional transient ledgers as designs that store only differences or updates to contracts in new blocks risk making the entire smart contract unusable once the baseline data falls off the blockchain.

Transaction rebroadcasting is one technique to insure token persistence, and has been adopted by the Saito blockchain, which is described below. This solution requires agents off-blockchain to monitor the blockchain and rebroadcast transactions to keep them in the active part of the blockchain.

This approach is not always suitable. In cases where a transaction represents a high value token, the risk of having it simply wiped-out as a result of human or operational error can be unacceptable. In blockchain networks that serve functional purposes like operating smart contracts, losing an entire smart contract can also be unacceptable. There are also potential vulnerabilities introduced by transient blockchains, most notably the possibility of the network experiencing attacks targeting one individual or organization or smart contract and trying to force only a select subset of transactions and data off the blockchain by censoring attempts to rebroadcast them.

A transient blockchain requires a 'pruning event' to occur at regular intervals. The pruning method and interval are determined by the consensus rules of the blockchain. For example, whenever a block is produced, a node that produces a block that is verified by other nodes in the network can also check the blockchain ledger for blocks or data that require pruning according to the general rules of the transient blockchain.

The various embodiments include the addition of a task to the pruning event, where the nodes check to determine what data and/or transactions are set to be pruned, and check to determine whether there is credit associated with the data that can be used to pay for the cost of rebroadcasting the transaction into the network. In the case of an unspent transaction output ("UTXO") or transaction slip from an ordinary monetary blockchain, this credit can be an amount of tokens associated with any unspent transaction value of slips. In the case of a smart contract network, it may be credit that is stored somewhere in the smart contract itself.

For both monetary blockchains and smart contract blockchains, the nodes that produce the blocks sift through the block data that is to be pruned, and flag all of the transactions or smart contracts that contain data that needs to be pruned, and check to determine if these transactions or contracts meet the criteria for auto-rebroadcasting as specified in the consensus rules of the blockchain. If they do meet these criteria, then the data that one wishes to keep on-chain is rebroadcast into the blockchain ledger, most likely as part of the next added block.

A transaction can be automatically kept on-chain very easily in this fashion. A smart contract is more complicated, since the entire smart contract may need to be rebroadcast with all of its variables and execution state(s) updated to reflect its current state of execution, in a manner that ideally avoids rebroadcasting the entire smart contract every time a transaction interacting with the smart contract falls off the blockchain (i.e., marking the major data-rebroadcasts on-ledger such that only the minimal number of rebroadcasts for contract integrity are performed). The blockchain can collect a fee for this service and deduct the cost of performing it from the transaction or smart contract that is being rebroadcast.

The example trigger above is based on the trigger being creation of a block as per the conventions of the Saito blockchain, but the trigger can theoretically happen at any time as long as the consensus rules of the blockchain insist that the nodes in the network that maintain the historical ledger and/or determine which transactions are valid.

The consensus rules of the blockchain may be left to its designers. There are meaningful trade-offs about what level of fees should be charged to transactions that are automatically rebroadcast, for instance, since different blockchains may wish to be more or less punitive to discourage or encourage reliance on the mechanism. Some may wish to make automatic transaction rebroadcasting cheap and easy so as to make using the network convenient and easy for users, who face little risk of their value tokens falling off the blockchain. Other blockchains may wish to charge a significant fee for this, so that the service exists as more of a safety catch to prevent the possibility of a successful attack on a second-layer on-chain bank application for instance. A variety of possibilities may emerge. One sensible option would be to define the fee as a multiple of the average or median fee in the block itself, so that the cost of rebroadcasting a transaction can be determined at any time by the economic constraints faced by those running the network, as reflected in the prices that other users are willing to pay to use the network.

Whatever the approach, the most practical way to implement this for UTXO and monetary blockchains would be to let transactions that wish to take advantage of automatic transaction rebroadcasting set a specific flag in their transaction that permits it (otherwise the blockchain needs to auto-rebroadcast ALL transactions that fit rebroadcasting criteria in a fashion that may be undesirable even to the users making the transactions and that may impose significant computational burden on the nodes in the data-processing network).

In the case of a smart contract system, ensuring that the smart contract is kept on blockchain and auto-rebroadcast is likely something that should be done when the smart contract itself is created and/or is enabled through some performative interaction that users of the smart contract can take to keep it online, such as submitting tokens to the smart contract that can be used to pay for further rebroadcasting. Different types of smart contracts can obviously specify where the credit that is used to pay the rebroadcasting fee is stored since this action is governed by the consensus rules of the blockchain, and it is even possible to determine what data is rebroadcast dynamically. Events can even be attached to the act of automatically rebroadcasting blockchain data, so that users can be informed of their new balances, for instance, or smart contracts can fetch external data and possibly run complex functions that are not entirely deterministic based on information that was not provided at the time the smart contract was created.

This method can be generalized into blockchain networks as once the first node that purges the blockchain and created the new block has done its work, the other nodes in the network simply need to check—as a consensus-level criteria for validating the block they now see eligible for inclusion in the network—that all of the transactions or smart contracts or block data that the blockchain consensus rules requires to be automatically rebroadcast have been rebroadcast and that the state of an additional data attached to the rebroadcast (such as the number of times it has been rebroadcast, the current fee paid for a broadcast) are valid. Any disagreement about what constitutes a valid rebroadcast would imply disagreement about the chain of data managed by the blockchain itself, and is thus theoretically impossible.

These and other aspects or features of the various embodiments are described in detail below with respect to FIGS. 3-7F.

In alternative or additional operations, which are as described in detail in the '514, '912, '944, and '974 applications (which have already been incorporated herein by reference in their entirety for all purposes), the plurality of nodes 110 might propagate an unconfirmed transaction 145 (among a plurality of transactions 145) across at least one of the one or more networks 120a-120n and/or the network(s) 125 (collectively, "peer-to-peer blockchain network," "blockchain network," or "network," or the like). [Hereinafter, the numbering of nodes has been reset compared with the embodiments described above, and the subsequent numbering of nodes generally corresponds to the numbering of nodes in the Related Applications.] The computing system 105 or a first node 110 among the plurality of nodes 110 might embed, into the unconfirmed transaction 145, a cryptographic signature and a network address that combines with other cryptographic signatures and network addresses that have been previously embedded in the unconfirmed transaction by one or more other nodes of the plurality of nodes 110 in the blockchain network to create a chain of signatures that constitutes an independently-verifiable and unforgeable record of a routing path that the unconfirmed transaction 145 takes as it propagates across the peer-to-peer blockchain network. The computing system 105 or a second node 110 among the plurality of nodes 110 might validate the chain of signatures embedded in the transactions included in a block of a blockchain to confirm that the block itself is valid in accordance with a set of consensus rules of the blockchain.

In some embodiments, each node among the plurality of nodes 110 in the peer-to-peer blockchain network might be associated with a unique public/private key pair and a network address. In some cases, the unique public/private key pair might comprise a public key and a private key. In some instances, the network address of a node among the plurality of nodes 110 might contain information derived from the unique public/private key pair of the node (in some cases, the information is derived from the private key of the unique public/private key pair of the node, while in other cases (e.g., in some PKI systems with which the public key cannot necessarily be derived from the private key, or the like), the information need not be derived from the private key itself), and a cryptographic signature of the node might be generated by using the private key of the unique public/private key pair of the node to sign a network address of a subsequent node among the plurality of nodes 110 to which the transaction is routed by the node.

According to some embodiments, the network address and the other network addresses might constitute a plurality of network addresses. In some cases, a network address associated with an originating node that originates the transaction might not be included in (or might be excluded from) the plurality of network addresses, based on a determination that information required to validate a cryptographic signature associated with the originating node is already included in the transaction. In alternative cases, a network address associated with the originating node might be included regardless of whether information required to validate a cryptographic signature associated with the originating node has already been included in the transaction. In some instances, the first node and the second node might be the same node. Alternatively, the first node and the second node might be different nodes.

In some embodiments, the computing system 105 or one or more third nodes among the plurality of nodes 110 might quantify a level of difficulty associated with producing a valid candidate block by reducing it to a burn fee, in accordance with a set of consensus rules of a blockchain. In some cases, the burn fee might be a cost denominated in a value of a token managed by the blockchain network. According to some embodiments, the computing system 105 or the one or more third nodes might quantify the value of one or more transactions being included in a candidate block by reducing it to a burn value, in accordance with the set of consensus rules of the blockchain. In some instances, the burn value might be a figure denominated in a value of a token managed by the blockchain network. In some embodiments, the computing system 105 or the one or more third nodes might determine whether a sum of individual burn values of the one or more transactions that are included in the candidate block is equal to or greater than the burn fee of the candidate block, in accordance with the set of consensus rules of the blockchain. Based on a determination that the sum of individual burn values of the one or more transactions that are included in the candidate block is equal to or greater than the burn fee of the candidate block, the computing system 105 or the one or more third nodes might determine that the candidate block is valid according to the set of consensus rules of the blockchain.

According to some embodiments, the burn fee might be algorithmically set by at least one computing system 105 or at least one node among the plurality of nodes 110 in the blockchain network. Alternatively, or additionally, a burn fee needed for production of a block might decrease over time in proportion to time elapsed since generation of a preceding block in the blockchain (as depicted in FIGS. 2A and 2B of each of the '514, '912, '944, and '974 applications). In some cases, a burn value of a transaction might comprise a transaction fee paid by an originator of the transaction for inclusion of its transaction in the blockchain. In some instances, a burn value of a transaction might be adjusted depending on whether the transaction contains a valid chain of embedded cryptographic signatures establishing a route that the transaction has taken in its course of propagating across the blockchain network. In some cases, a burn value of a transaction might be adjusted downward depending on the number of hops that the transaction has made across the blockchain network, as measured by an embedded chain of cryptographic signatures contained within the transaction that document its course of transmission across the blockchain network. In some instances, the burn value of the transaction might be halved with each additional hop beyond a first hop that the transaction has made through the blockchain network from its point of origin to its point of inclusion in a block.

In some embodiments, at least a majority of the plurality of nodes 110 in the blockchain network might determine whether aggregate burn values of the transactions included in a block are sufficient to pay for the burn fee required for production of a block. Based on a determination that the aggregate burn values of the transactions included in the block are sufficient to pay for the burn fee required for the production of the block, the at least a majority of the plurality of nodes 110 in the blockchain network might determine that the block is valid and might include the block in a blockchain. In some instances, at least a portion of a difference in value between a burn value of a transaction included in a block and a burn fee needed to produce a block, as measured in the value of the token managed by the blockchain network, might be granted to a node among the plurality of nodes 110 that produces the block as a form of payment for producing the block. In some cases, at least a portion of the burn value of the one or more transactions included in the candidate block might be removed from circulation and not transferred to a node that produced the candidate block.

According to some embodiments, the computing system 105 or one or more fourth nodes among the plurality of nodes 110 within the blockchain network might prune all transaction slips in blocks in a blockchain preceding an arbitrary block identified according to consensus rules of the blockchain, and might calculate a value of all unspent tokens contained in all unpruned blocks preceding and including the last block being pruned. The computing system 105 or at least one node among the plurality of nodes 110 might adjust a monetary policy of the blockchain network so that the blockchain network would reintroduce (or recycle) the unspent tokens as tokens allocated in future blocks. In some cases, the unspent tokens might be reintroduced back into the blockchain network in a later block through use of golden tickets.

In some embodiments, the computing system 105 or a fifth node among the plurality of nodes 110 in the blockchain network might generate a golden ticket that contains a computational puzzle. The computing system 105 or a sixth node among the plurality of nodes 110 in the blockchain network might generate a solution to the computational puzzle in the golden ticket, where the solution to the computational puzzle might be used to select one or more network nodes among the plurality of nodes 110 in the blockchain network, in a manner that cannot be anticipated by the computing system 105 or the fifth node generating the golden ticket. In some instances, at least two of the first node, the second node, the third node, the fourth node, the fifth node, the sixth node, one of the selected one or more network nodes, and/or the computing system 105 might be the same node. Alternatively, the first node, the second node, the third node, the fourth node, the fifth node, the sixth node, the one of the selected one or more network nodes, and the computing system 105 might be different nodes. In some embodiments, the golden ticket might be at least one of included in a block published for inclusion in a blockchain or automatically associated with the block, and/or the like. In some cases, the golden ticket might include, without limitation, a random number that is created using data associated with the block. In some instances, the random number might comprise a cryptographic hash of data content contained within the block. In some cases, the solution to the golden ticket might be included in a block immediately following the block in which the golden ticket is included was published. In some instances, any valid blockchain might contain one or more golden tickets, each of which may be solved only once.

According to some embodiments, a block might contain only one solution to any particular golden ticket. In some cases, a block might contain only one golden ticket. In some instances, a block might contain a solution to only one golden ticket. In some cases, a block might be considered to be invalid based on a determination that the block contains a golden ticket solution that is invalid. In some instances, the solution to the computational puzzle in the golden ticket might comprise a product of a computationally difficult challenge that is independently verifiable by other nodes 110 in the blockchain network. In some cases, the solution to the computational puzzle in the golden ticket that is generated by the sixth node might be generated based on a hash of data associated with the golden ticket that meets validity criteria as defined in consensus rules of the blockchain.

In some embodiments, the solution to the computational puzzle in the golden ticket might be used to select one or more network nodes from a subset of network nodes among the plurality of network nodes 110 in the blockchain network that are identified as being valuable routing nodes with regard to production of a block containing the golden ticket. In some instances, routing nodes might be determined to be valuable based at least in part on data from a list of active routing nodes recorded within chains of cryptographic signatures and addresses embedded within transactions that are contained in the block containing the golden ticket. In some cases, the list of active routing nodes might be restricted to network nodes 110 that are recorded within chains of cryptographic signatures and addresses embedded within transactions that are included within the same block that contains a golden ticket. In some instances, a likelihood that the one or more network nodes are selected might be weighted according to a determination that the one or more network nodes are each perceived to contribute to health of the blockchain network as a whole, as measured based on consensus rules of the blockchain and using factors including at least one of a value of a transaction fee associated with each transaction or a burn value of a transaction.

In some instances, the computing system 105 or the sixth node among the plurality of nodes 110 in the blockchain network might broadcast the solution to the golden ticket throughout the blockchain network, the solution being included in a subsequent block that is produced and validated by the blockchain network. According to some embodiments, the computing system 105 or a node among the plurality of nodes 110 might distribute blockchain tokens to the one or more network nodes that are selected using the solution to the computational puzzle in the golden ticket. In some instances, an amount of tokens allocated through use of golden tickets might be equivalent to transaction fees paid in a block containing a golden ticket that contains a computational puzzle to which a solution has been generated. In some cases, an amount of tokens allocated through use of golden tickets might be equivalent to transaction fees paid in a block containing a golden ticket that contains a computational puzzle to which a solution has been generated, minus any value tokens allocated to a network node that generates the block containing the golden ticket, and adjusted to be plus or minus another amount determined by consensus rules of the blockchain to maintain a consistent money supply. In some cases, tokens allocated through use of golden tickets might be split between one or more network nodes that have provided solutions to golden tickets ("lucky miners") and one or more nodes selected by one or more solutions to the golden tickets ("lucky nodes"). In some instances, distribution of the tokens split between lucky miners and lucky nodes might be determined by a paysplit variable managed according to consensus rules of the blockchain, while a difficulty level of the computational puzzle might be determined using a difficulty variable managed according to the consensus rules of the blockchain.

In some cases, the difficulty variable might be adjusted to make selection of which network nodes to provide eligible solutions either more difficult or less difficult, where a higher difficulty corresponds to a reduced set of nodes that will be considered eligible to generate solutions under the consensus rules of the blockchain. In some instances, the computing system 105 or at least one of the nodes 110 might embed, within a solution to a golden ticket, a variable that indicates whether to increase, to hold constant, or to decrease a value of the difficulty variable managed according to the consensus rules of the blockchain. In some cases, the computational puzzle might establish a two-player chain, wherein the two-player chain established by the computational puzzles might be extended into a chain with an arbitrary number of participants, to perform at least one of providing additional randomness or splitting allocation of tokens into a finer distribution settling to more participants in the blockchain network.

In some embodiments, the computing system 105 or at least one of the nodes 110 might embed, within one of a block or a golden ticket, a variable that indicates whether to decrease, to hold constant, or to increase a value of a network consensus variable ("vote of the block" or "vote of the golden ticket"). In some cases, blocks that contain a vote of the block indicating whether to decrease or to increase a value of the network consensus variable might include only transactions that are consistent with the vote of the block indicating whether to decrease or to increase the value of the network consensus variable. In alternative embodiments, the computing system 105 or at least one of the nodes 110 might embed, within a solution to a golden ticket, a variable that indicates whether to decrease, to hold constant, or to increase a value of a network consensus variable ("vote of the golden ticket"). Alternatively, or additionally, the computing system 105 or at least one of the nodes 110 might embed, within a transaction, a variable that indicates whether to decrease, to hold constant, or to increase a value of a network consensus variable ("vote of the transaction").

As in other blockchains, users in the blockchain network of the various embodiments create transactions and broadcast them into a mesh grid that assembles these transactions into blocks and arranges these blocks into a sequential blockchain that represents the transaction history of the network, treating the longest chain at any time as the ledger of record. Unlike other types of blockchains, the methods according to the various embodiments change the class of nodes that have the right to bundle transactions into blocks.

As alluded to above, in traditional blockchains like Bitcoin and Ethereum™, the work of creating blocks is given to "miners" or "stakers" who assume financial risk for the right to issue blocks: contributing currency or hashpower to the network in a way that exposes them to the risk of losing money if they are unlucky or if they cheat the system, but that results in the network becoming more secure against attackers who wish to over-write payment or censor network activity. These nodes are not necessarily the same as the nodes that handle the majority of the traffic in the peer-to-peer system. In both networks, the nodes that focus on earning revenue generally "specialize."

In contrast to this traditional approach, in our approach, it is the regular nodes in the peer-to-peer network (namely, the ones that provide bandwidth and that collect and propagate transactions) that have the right to create blocks, incentivized to do so to secure the revenue associated with bundling transactions into blocks. To regulate the pace of block production and secure the system, it is necessary that this action cannot be free, and thus we specify that producing a block requires the payment of a "burn fee" that is set algorithmically by the network and denoted in the currency of the network token (the same token in which fees are paid). In the software developed to use this method, our algorithm sets this "burn fee" to a high value immediately after a block is found and decreases it gradually over time until it eventually hits zero, at which point any node on the network can produce a block free-of-charge. While this design eliminates the possibility of a "hash crash" by putting an upper-limit on the time between blocks, nodes are still expected to produce blocks as soon as the transaction fees they have in their mempool are greater than the "burn fee" required by the network (i.e., as soon as it is profitable). This economic dynamic is illustrated in FIG. 2A of each of the '514, '912, '944, and '974 applications.

It is easy to see how this results in an optimized block time: the pace of block production in our system is determined by the overall volume of transactions fees paid into the system as a whole. And while it is less obvious that this provides equivalent security to a proof-of-work system, consideration will show that it does: attackers who wish to re-write the main chain will not succeed unless they are capable of producing blocks at a faster pace than the network as a whole, something that in practice requires either access to a greater flow of transaction fees than the rest of the network combined, or a willingness on the part of the attacker to burn their own capital to create fake transactions that pay real fees. Either way, as FIG. 2B of each of the '514, '912, '944, and '974 applications illustrates, the cost of any attack on the network increases relative to the increase in speed that attackers need to achieve in block production to overcome the main chain's lead and build the longest-chain.

By creating a relationship between the speed of block production and the cost paid by nodes on the network, we create a lever we can use to make attacking the network prohibitively expensive. Our security dynamic is similar to that of other blockchains in the sense that attacking the network now requires attackers to expend significant resources. And to ensure that even minor increases in the pace of block production cost significant amounts of money, we specify that our network algorithmically adjusts its "burn fee" upwards over time to keep block time constant as transaction volume grows. Although any method which accomplishes this is fine, we handle it in practice by adjusting our burn fee up and down every N blocks so as to keep our desired equilibrium block time constant.

While this method works, and distributes the fees from transactions to the nodes that take part in the peer-to-peer propagation network, it creates an economic problem that we need to solve to implement it in practice. Specifically, our requirement that nodes pay a "burn fee" to create blocks necessarily results in a process of steady deflation (as depicted in FIG. 2C of each of the '514, '912, '944, and '974 applications) that gradually destroys all of the currency in our system. To avoid these deflationary pressures, our system thus requires the provision of a separate mechanism to reintroduce our "burned" currency back into our system. But we cannot do this in any way that gives the block-issuing node any control over how these funds are dispersed. The reason for this is that if the same blocks that pay the "burn fees" can also influence the distribution of those fees, they can game or sibyl the network to lower their cost of producing future blocks, and thus their cost of attacking the network. Additionally, any ability for nodes to "subsidize" future block production with fees from a previous block turns the activity of block production into a thinly-disguised proof-of-work approach where the competitive advantage in block-issuance comes not from gathering transactions on the peer-to-peer network so much as devoting computational resources to gaming the system.

What this means in terms of blockchain design is that we must separate the act of producing blocks from the act of distributing funds. This is something new since in existing systems the fees and coinbase gathered by "miners" and "stakers" are issued to the nodes that produce the actual blocks. And our method for solving this problem is genuinely novel, working through the creation of a system that plays out between our two main classes of nodes (those that contribute to the peer-to-peer network and those that serve the security function of the system). And our method works by pitting these two classes of nodes against each other in a long-term struggle to control the distribution of revenue produced by the system. This struggle is systematized through a multi-player voting system that approves of changes to consensus network-wide settings like the percentage of the fee that goes to nodes in the peer-to-peer network versus the percentage of the fee that goes to the miners.

In practice, our own system works as follows. Every time a node produces a block, it collects what profit it can (the transaction fees it is allowed to use minus the required network burn fee) and bundles the remaining transaction fees it has collected into a "golden ticket" that contains a computational puzzle for the miners in the network to solve. In addition to producing this "golden ticket," the node that produces the block in our peer-to-peer network also includes a vote on whether to increase, decrease, or hold constant the share of the "burn fee" that will be distributed to "miners" as opposed to being distributed to the "nodes," where "miners" herein refers to nodes that choose to solve computational puzzles and "nodes" refers to nodes that provide bandwidth and connectivity in the peer-to-peer network. This vote over the distribution of income is referred to herein as the "paysplit vote." The consensus network determination of how fees are distributed is referred to herein as the "paysplit."

As nodes produce blocks and propagate them, miners examine the "golden tickets" (along with their paysplit votes) and choose for themselves which blocks they wish to support. If they decide they want to support a golden ticket, they must find a solution to a computationally difficult puzzle and share it with the rest of the network.

Although there are many possible variants for this puzzle, the computational puzzle that is selected for miners to solve, according to some non-limiting embodiments, includes, but is not limited to, the challenge of producing a public/private keypair that can sign a hash-value in a way that the resulting signature meets criteria that can be easily tested by the rest of the network. Miners, in some instances, are suggested to start with an SHA256 hash or the like of the contents of the golden ticket, with their challenge appending to this hash their own public key and then signing the hash+key combination such that it produces a cryptographic signature (i.e., signing the results with their private key) where the final N digits in both the signature and the golden ticket hash value match, where N here is a consensus variable that is adjusted up or down by the network through a separate "difficulty vote" in a process that will be described shortly. The reason for using this method is that miners can publish the proof that they have found a solution into the network without providing the ability for other nodes or miners to steal it (since only the miner that found the proof has the necessary private key to create a valid signature, and since the public key is associated with the miner who found the solution). And yet all nodes can easily verify that the miner has indeed found a valid proof by simply checking the proffered signature against their public key.

All that is really needed in this puzzle is that the miners have the ability to solve a computationally-difficult task, the difficulty of which can be adjusted, and of which proof of success can be broadcast without sharing the ability for other players to copy the solution and thus steal the funds. Regardless of the specific puzzle chosen, we specify that should a miner choose to devote the computational effort required to solve one of these golden tickets, and should it succeed in actually finding a workable solution, the miner must propagate its solution back into the network as a regular fee-paying transaction in time for inclusion in the very next block (variations with longer time limits are permissible as well). Miner solutions to the golden ticket must include all of the information needed by third-parties to verify that the miner has solved the computational puzzle successfully, along with the previously mentioned second vote on whether to increase, decrease, or hold constant the difficulty of the computational puzzle itself ("difficulty vote").

Once a golden ticket is solved by a miner and its solution is included in the next block, the "burn fee" contained in the golden ticket is released to the network, split between the miner that found the solution and (a randomly selected) one of the nodes that participates in the peer-to-peer network and that propagates transactions according to the consensus paysplit values. And while any method for selecting this random node in the peer-to-peer network is acceptable as long as it rewards nodes that actually propagate and source transactions, in some embodiments of the current codebase, a hash-value produced in the miner solution may be used as a random input to an algorithm that selects a node that was involved in propagating one of the transactions found in the previous block, and whose address or public key can be found in the path-history of the transaction (as described further below). The logic of how and when fees are distributed is presented in FIG. 5 of each of the '514, '912, '944, and '974 applications.

Additionally, once a golden ticket has been solved and has been incorporated into the blockchain, the two votes that have been made in the process ("paysplit vote" and "difficulty vote") are then used as inputs by the network into an algorithm that periodically adjusts the consensus paysplit and difficulty settings for all subsequent blocks on that chain. The logic of how votes are generated and counted is presented in FIG. 6 of each of the '514, '912, '944, and '974 applications.

In practice, this dynamic creates a struggle between miners and nodes for the revenue created by the system, driving the network into a long-term equilibrium where revenue is distributed between the nodes in the peer-to-peer network and the miners "securing" the network according to the underlying economic costs of bandwidth and security provision. The security of the network is increased as the network grows and transaction volume grows regardless of the activity of the miners. But the miners nonetheless play an important role in preventing attacks, for the higher they drive the difficulty of solving the "golden tickets," the greater is the difficulty for any attacker to change the consensus paysplit and difficulty settings of the network in a way that will allow them to produce blocks at a faster pace than the main chain and thus launch a successful attack on it.

The dynamic described above is sufficient to secure the network. To strengthen it against more subtle attacks, a few other changes may optionally be implemented as well.

To encourage the levels of bandwidth and security provision provided by our multiple classes of nodes to reflect the needs of the users and applications on the network (rather than those of the nodes and miners themselves), we specify that users who send transactions into the network may optionally tag their transactions with a separate paysplit vote. And we specify that should a user-originated transaction contain a paysplit vote to either increase or decrease the consensus paysplit setting, it can only be included in a node-produced block that votes in the same direction.

To make attacks on the network more expensive and make it easier to identify which nodes are active in supporting the peer-to-peer network, we can also optionally have nodes sign transactions as they propagate through our network, creating an unforgeable history of the path each transaction that is included in the transaction and documents its transmission from its point of origin to its point of confirmation and inclusion in a block. We can also optionally specify that nodes are permitted to bundle any transaction in any block, but cannot use the fees paid by transactions against the "burn fee" they need to pay unless their own node can be found in the cryptographically signed transaction path for that specific transaction. Additionally, to make sibyl attacks on the network economically unproductive, we decrease the amount of the overall transaction fee that any node can allocate to its "burn fee" with each hop that a transaction takes through the network (with the remainder being simply added automatically to the golden ticket). And to prevent a subtle attack that involves hostile players manipulating network-wide changes in the burn fee to produce blocks at a faster pace than the rest of the network, the rules may stipulate that nodes prefer blocks that have a higher initial burn fee than blocks that have a lower burn fee at any particular block depth (i.e., if two blocks share the same block ID but one has a higher burn fee, the latter becomes the preferred block).

The Saito Network:

The blockchain system or approach described herein (also referred to herein as the "Saito Network," "Saito platform," or the like) is a cryptocurrency platform for applications that need to send large amounts of data across the blockchain. You can use it today to build "unastroturfable" Internet forums, decentralized social networks, pay-to-play websites, distributed data-routing services, peer-to-peer email hosting, SSH-key registries that are secure from MITM attacks, and/or the like.

On a technical level, the Saito platform described herein is notable for its use of a disposable blockchain, a proof-of-transactions system that splits network fees between bandwidth and security providers, and an economic incentive structure that protects the network from sibyl attacks and ensures that even attackers with overwhelming influence in any sector cannot dictate the behavior of the network as a whole.

The Disposable Blockchain:

As in other blockchains, users in the blockchain network described herein (i.e., the Saito Network) create transactions and broadcast them into a mesh grid that assembles them into sequential blocks, treating the longest chain as the ledger of record. While all transactions support basic payment functionality, they also include a signed "message" field where data can be bundled and read by applications that sit atop the network.

In the case of other blockchains, developers have been reluctant to permit users to include extra data in transactions out of fear of placing ever-increasing bandwidth and storage requirements on nodes. In the case of Bitcoin, this has led to conflict not only over the maximum block size, but even over the more trivial question of whether transactions should support a 40 or 80-byte OP_RETURN field.

For the Saito Network, we take for granted that even an 80-byte message field is hardly enough space for real-world applications, and our solution to the problem of data-creep is to use a disposable blockchain. In this system, the nodes in our network can simply throw out the oldest data in our ledger at predictable intervals, making it impossible for payment inputs to be used after an arbitrary length of time. Since the "genesis block" is always creeping forward, there is no definitive starting time for the network, yet we do not consider this a major vulnerability because even Bitcoin users are vulnerable to chain-poisoning at their first point of contact (i.e., client software download). And there remain many ways for users to guard themselves against the risk of ending up on a minority fork: primarily by connecting to multiple trusted peers and monitoring the longest-chain. And cross-fork payment issues can also be avoided by the use of large-transaction "inception payments" (or payments-within-payments) in which the receiver only publishes the bundled payment to the blockchain once they can confirm they have access to the funds contained therein (i.e., as soon as they confirm they are on the same chain as the payment input). Here as elsewhere, extensible transactions allow creative ways to solve many problems that occur in other blockchains. And there is no practical limit to our creativity: we can even chain "inception payments" to include any number of participants, with the only limit being the point where the fees required for transmitting the transaction make the payment itself economically infeasible (i.e., the dreaded "limbo payment").

Our disposable blockchain gives the Saito network many advantages over alternate systems. Unlike Bitcoin, we do not face an ever-expanding UTXO set because so-called "dust transactions" (i.e., transactions that contain minuscule and unspendable amounts of bitcoins or tokens and that are encoded with human-readable, non-payment information into false addresses, or the like) are eliminated organically from our system over time. Uncertainty over what the network-wide rates of inflation and deflation are also avoided, since lost funds are recycled or reintroduced into future coinbase issuances and the exact amount of currency in circulation at any point is calculated. The risk of attackers launching long-term re-organization attacks is also lower with the Saito Network than with competing networks because many long-term attacks become impossible to pull-off with a disposable blockchain: attackers need not only produce a viable competing blockchain as elsewhere, but now also need to do so before the network collectively discards the block they are using as the basis for their proposed fork.

While a disposable blockchain helps solve the technical challenges involved in scaling up transaction sizes, there are two more fundamental economic problems we need to solve as well: the "tragedy of the commons" problem that is caused when transaction fees do not cover the true cost of long-term data storage, and the "free rider" problem that exists when miners (who provide transaction irreversibility) are paid out of fees while nodes (which provide bandwidth and open-access) are expected to operate on a volunteer basis. Because the bandwidth requirements of running a Saito node increase with transaction sizes, both problems will be intractable in our network unless we find some way to pay for node provision in addition to network security. This is a hard problem because the amount of funding we need for each group of actors depends entirely on economic pressures and not on technical ones. The problem is further complicated because the distribution of fees cannot be made arbitrarily as with Bitcoin but must instead be driven by a mechanism that allows the actual economic demands of applications for security vis-a-vis open access and connectivity to be reflected in the fee-distribution mechanism. On top of all of this, our solution must also be secure against attack, and drive all actors in the network to promote the welfare of the network even as it drives them to maximize their private profits.

The Solution:

As with Bitcoin, nodes in the Saito Network create blocks to secure the fees associated with bundling transactions. Unlike Bitcoin, the cost of producing a block is not the arbitrary expenditure of "hash power" but rather a "burn fee" that is set algorithmically by the network. In some embodiments, this "burn fee" is set to a high value immediately after a block is found and decreases in stepwise fashion until it eventually hits zero, at which point any node on the network can produce a block free-of-charge. While this design eliminates the possibility of a "hash crash" by putting an upper-limit on the time between blocks, nodes are still expected to produce blocks faster on average: as soon as the transaction fees they have in their mempool are greater than the "burn fee" required by the network (i.e., as soon as it is profitable). This is shown in FIG. 2A of each of the '514, '912, '944, and '974 applications, as further described below.

It is easy to see how this results in an optimized block time: the pace of block production is determined by the volume of transactions fees paid into the system as a whole. And while it is less obvious that this provides equivalent security to a proof-of-work system, consideration will show that it does: attackers who wish to re-write the main chain will not succeed unless they are capable of producing blocks at a faster pace. And this means in practice that they will need either a greater flow of transaction fees than the rest of the network combined, or be willing to burn their own capital to make up the difference: creating fake transactions that nonetheless burn real fees. As FIG. 2B of each of the '514, '912, '944, and '974 applications illustrates, the cost any attack thus depends on how quickly the attackers need to produce blocks to overcome the main chain.

To ensure that even minor and temporary increases in the pace of block production cost significant amounts of money, the Saito Network automatically adjusts its "burn fee" upwards over time to keep block time constant as transaction volume grows. One subtle benefit of this design is that attacking the network grows more expensive the more transactions it serves, essentially creating a virtuous cycle that encourages economic activity to concentrate on the most secure chain. Another more subtle advantage of this approach is that by quantifying the costs of any attack, users and applications can gauge for themselves whether security is adequate or inadequate for their needs. Yet another subtle benefit of this design is that long-term attacks become far much expensive to pull-off than short-term chain re-organizations, since the pace of block production in long-term chain re-writes needs to be significantly higher than in short-term ones in order for attackers to pull off a network-wide chain re-organization before their forking-off-block is discarded from the ledger.

Of course, there is also an issue we need to overcome, as depicted in FIG. 2C of each of the '514, '912, '944, and '974 applications. As can be seen in FIG. 2C of each of the '514, '912, '944, and '974 applications, any network that relies upon nodes to "burn capital" to issue blocks will eventually run out of funds. We can avoid this by adding a coinbase to our system, but as long as the block-finding node has any influence over how funds are distributed (as is the case in other blockchains), a savvy attacker can sibyl or otherwise game the block-finding process to increase their chances of capturing the revenue. If we were to use the new block hash value to randomly distribute funds between nodes in the network, for instance, an attacker could experiment with producing multiple valid blocks until it found one that benefited it individually. And this design thus fails our requirement that economic incentives need to promote the welfare of the system as whole, since any flaw of this nature not only reduces the cost of a re-organization attack (encouraging attackers to subsidize their attacks with recycled money), but also transforms our network into a thinly-disguised proof-of-work system, one in which nodes now compete to earn profits not by processing transactions efficiently so much as expending resources to sibyl/game the network.

Fortunately, we have a solution to this problem, and it constitutes one of the major innovations of the Saito Network. And it is remarkable since in addition to making it impossible for nodes to game currency issuance, and thus enable proof-of-transactions as a secure alternative to both proof-of-stake and proof-of-work, our method also secures the network against sibyl attacks, ensures that nodes continually optimize the distribution of transactions through the system, and creates a system that naturally allocates fees between bandwidth and security providers in the most efficient way possible. This solution is the incorporation of a system in our fee-distribution process that ensures good behavior by the three players in the network: users, nodes, and miners. And then we ensure that the resulting dynamic always protects the network by ensuring that any two parties can always collude to balance the overweening influence of a predominant third.

The Struggle for Profit:

Our system begins with a zero-sum battle between nodes and miners for the "burn fees" paid by our nodes during the course of block-creation. This system works as follows:

Every time a node produces a block, it collects what profit it can and bundles the remaining fees into a "golden ticket" that contains a computational puzzle for miners to solve, along with a vote on whether to increase, decrease, or hold constant the share of the burn fee that will ultimately be distributed to miners instead of randomly to one of the bandwidth-providing nodes in the network ("paysplit"). Miners choose for themselves whether to solve these golden tickets, but finding a solution is not enough, for should a miner succeed in solving one, it must propagate its solution back into the network as a fee-paying transaction for inclusion in the very next block. As part of this solution, the miner may also make a secondary vote on whether to increase, decrease, or hold constant the difficulty of the computational puzzle.

From these simple rules, a remarkable development ensues. The struggle to control the network in our two-player system requires a delicate dance between collusion and cooperation for both nodes and miners alike. For while nodes and miners both want to generate at least one solution per golden ticket (because otherwise no one gets paid), their interests otherwise diverge: miners prefer a high paysplit and high difficulty level, while nodes prefer a low paysplit and low difficulty level. While the reason for their disagreement over paysplit is obvious, that for their difference of opinion on mining difficulty is more subtle: miners prefer a high difficulty as that reduces the expected competition they face from their peers and thus lowers the expected transaction fee they need to pay to induce nodes to prefer their solution (i.e., increasing their "take-home" share of the burn-fee); nodes meanwhile prefer a low difficulty rate not only because inter-miner competition increases the fees paid to them (and speeds up the pace of block production in the process, further securing their own income) but also because easier golden tickets hold out the salivating prospect that nodes may be able to select between multiple solutions and even pick one that rewards them.

According to some embodiments, it may be specified that once a golden ticket is solved by a miner and their solution is included by a node, the coinbase funds in the ticket are released to the two winners of the activity, and the votes over paysplit and difficulty take effect. And this is another point where the Saito Network diverges from all existing cryptocurrency systems. Strategically, the fact that votes in our network pass back and forth between nodes and miners, and require implicit approval from both groups to take effect, pushes us into a dynamic where nodes and miners must collude to protect their group interests (refusing to process the harmful votes of their counterparties) while using their own clout to promote friendly blocks. Yet collusion is difficult because both parties can also induce defection from the other side. Nodes can pad their golden ticket with extra funds to induce hashing support from renegade miners, while miners can propagate their solutions with higher fees to bribe support from nodes.

Whereas most cryptocurrencies work as technical games, the Saito Network plays out as a zero-sum economic battle that is fundamentally unsolvable. For the competition between our two groups is ultimately not driven based on algorithmic factors so much as competitive pressures to collude to protect long-term profits. Yet, because cartelization inevitably pushes up profits and because our system is open-by-design, excessive profit cannot survive over the long-term: any side that succeeds in driving up class income will simultaneously invite the market to provide more of the desired value, whether by inducing miners to enter the market, or inducing nodes to take advantage of a high paysplit and "pull the trigger" on block production faster than their peers.

Our two-player system will eventually reach equilibrium at the point where the security provided by miners is optimal given their relative costs of collusion, but we acknowledge that this level is arbitrary and may not reflect the amount of security (or bandwidth) desired by the applications on the network, something especially relevant given that our demand for security from miners decreases naturally as the volume of transactions grows. And so, in some embodiments, we introduce a third party whose market preferences ensure we hit an optimal economic distribution of fees between nodes and miners. This third party consists of the users who make up the network, and who are allowed by the network to tag their transactions with an optional paysplit vote. Should a user-originated transaction contain a paysplit vote, the system insists that it can only be included in a block that votes in the same direction. Users who choose to take sides in this ongoing struggle between nodes and miners thus sacrifice the reliability and speed of transaction confirmation but gain marginal influence over the direction of the network by increasing the flow of capital to the party that represents its interests in the central two-player system.

Our resulting three-party system is thus unsolvable. Miners are perhaps the most influential party at small scale but lose influence as the volume of transactions grows (adding a secondary level of security) and it becomes easier for nodes to collude (i.e., harder for miners to operate their own nodes). And while the user/application influence is arguably weakest at the beginning, it ultimately becomes the most powerful influence on the network. And yet even with any group at its apex, no particular group is ever fully ascendant, for any two players in our system can always collude to protect the network from the overweening influence of the third player.

Security in the Saito Network:

The dynamic described above is sufficient to secure the network. To make attacks more expensive, we have nodes sign transactions as they pass them through the network, creating an unforgeable history of the path each transaction takes to its point of confirmation. We also decrease the amount of the transaction fee available to nodes with each hop a transaction takes through the network. And we specify that the node that benefits from the node portion of the golden ticket is selected from one of the recorded participants according to a random input variable provided as part of the mining solution.

These additional restrictions secure our network from common attacks visible in other cryptocurrencies that are—oddly—not often recognized as attacks. In our system, for instance, transactions are naturally valuable to nodes that participate in the P2P network and useless to attackers that "lurk" on the edges. The fact that nodes must participate in the P2P network prevents an under-provision of connectivity and defends the network against subtle attacks on open-access like those posed by the Bitcoin FIBRE network, a closed relay that benefits colluding participants by undermining the profitability of those who mine on the P2P network. Sibyl attacks are also eliminated over time, because nodes themselves are incentivized to purge sibyls from profitable transaction paths; and in routing around them they increase the robustness of the network as whole. Nodes pay other nodes for connectivity in the form of valuable transaction flow, and transaction hoarding becomes a minority strategy since even the nodes that merely participated in propagating a transaction have a chance at winning the node-share of the golden ticket.

Security is also reinforced by the incentive structure of our system. For one, if network security falls too low, all parties can increase it by simply agreeing to pay miners more. Greater pay for miners encourages them to support the threatened chain in the long-run, while the increased competition attracted by the fattened paysplit speeds up block issuance on the threatened chain. Even in situations where the network is not under active attack, the miner/node battle over the paysplit vote also serves a "canary in the coalmine" function, encouraging miners themselves to issue an alternate chain if they control enough hashpower to outcompete the main chain. Rather counterintuitively, it is the threat and possibility of short-term miner attacks that forces the network to keep its short-term security levels high enough that it is protected from long-term attacks.

And since it is theoretically possible for a stealth chain to tweak its paysplit and difficulty settings to lower its overall cost of block production, our difficulty vote plays an equally important role in warding off attacks. The reason for this is that because miners need to solve "golden tickets" in order for the network to "approve" consensus changes to the paysplit/difficulty settings, higher difficulty levels force attackers to devote more time and money to changing consensus settings. Properly understood, this offers a significant improvement over the security of Bitcoin's proof-of-work function, since our network is protected not only by the need for attackers to have the financial resources to generate transaction volume, but also now by a miner-protected voting mechanism that requires significant hashpower to overcome. And it stipulates that the main chain—saving a total collapse in user, miner and node activity—will always be able to change its own network settings more quickly than attackers can manipulate their own.

There are many subtle attacks and responses that flow out of our system. But most responses are obvious. One unlikely but possible attack is an attacker burning capital to manipulate the burn fee of the main chain up, and then continuing to produce blocks on a lower-difficulty stealth chain at a faster pace than the main network can adjust its burn fee downwards again. This can be avoided by having nodes arbitrarily prefer blocks that have a higher initial burn fee than their competitors at any particular block depth.

In any event, blockchain security is not just about protecting users from reorganization attacks, it also implies censorship resistance. And in this field, even a successful attack on the network is not able to accomplish much beyond driving up the price of network token while amassing the resources for an attack on the network. Extremely wealthy attackers can burn cash to censor transactions, but they can do this in Bitcoin as well (by pricing out competing transactions). And even if an attack does overwrite a substantial portion of the blockchain, most of the transactions they overwrite can be almost immediately bundled onto the end of the winning chain by the nodes that initially published them, where they then add to the security of the now-longest chain. And with users shifting from direct payments to "inception payments" in the face of greater network insecurity, and exchanges scrambling to increase their support for miners in the face of greater risk, losses from any reorganization attack will disproportionately affect miners and nodes. Of course, the network can promptly recover unless the attacker has essentially limitless financial resources, in which case users can simply sell their tokens for profit and move to a network fork.

On a final note, we also observe that by forcing the network to deal with only a finite amount of data at any time, we are also protected from a huge class of software development risks. Whereas other blockchains deal with enormous scalability problems driven by their need to develop custom code to enable scaling, the fact that the Saito Network need only store a limited amount of transactional data (and can always reduce this period as our transaction volume grows) keeps the software requirements on the scale where existing industrial databases and other components can be leveraged. In-memory databases already scale into the hundreds of terabytes, and there is no risk of server requirements expanding beyond the amount that an independent server can handle, given the predictable income stream generated from the work of storing and processing transaction data.

Although not specifically described, the aspects or features of the various embodiments as described in detail below with respect to FIGS. 3-7F may be applied to the Saito blockchain system as described above and as described in greater detail in the '514, '912, '944, and '974 applications (which have already been incorporated herein by reference in their entirety for all purposes).

Figure 2:
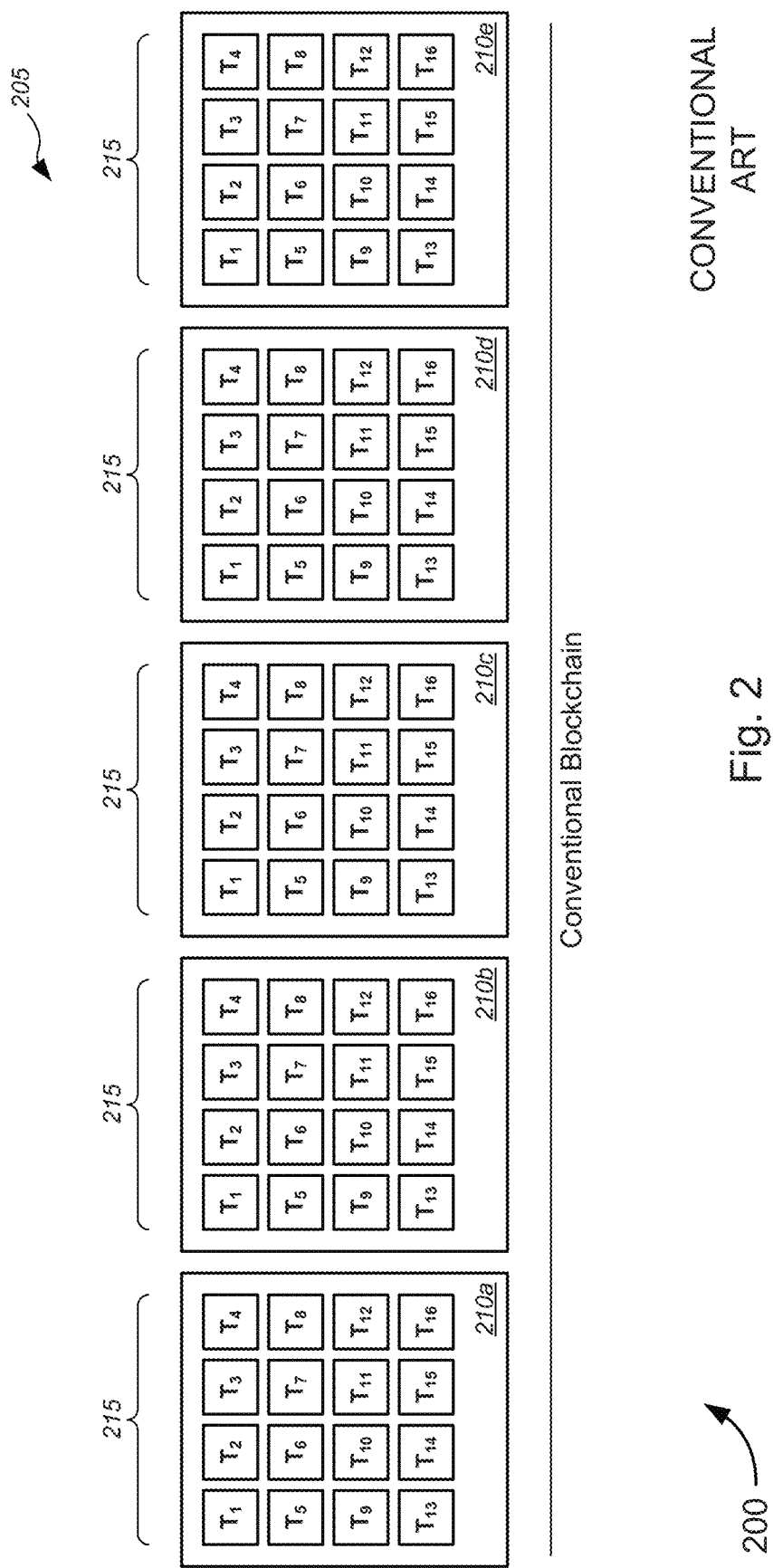
FIG. 2 is a schematic diagram illustrating an example of a conventional blockchain including a plurality of transaction slips.

FIG. 2 is a schematic diagram illustrating an example 200 of a conventional blockchain including a plurality of transaction slips. In particular, depicted in FIG. 2 is a conventional blockchain that has a permanent ledger, or the like, and that does not possess any rebroadcasting functionalities.

Referring to FIG. 2, an example 200 of a conventional blockchain 205 might comprise a plurality of blocks 210a-210e (collectively, "blocks 210" or the like), each block 210 containing a plurality of transaction slips $T_1$-$T_{16}$ 215. For purposes of simplicity of illustration, only five blocks 210 are shown in the blockchain 205 in FIG. 2, although typical conventional blockchains 205 might comprise any suitable number of blocks 210. Although only 16 transaction slips 215 are shown in each block 210, typical conventional blockchains 205 might contain any suitable number of transaction slips 215. Although not shown, each block 210 might also contain other data as well as a coinbase, a solution to a computational puzzle, and/or the like.

In such conventional or traditional blockchains, new blocks are added in sequence at the end of the blockchain and older data is never removed.

Figure 3:
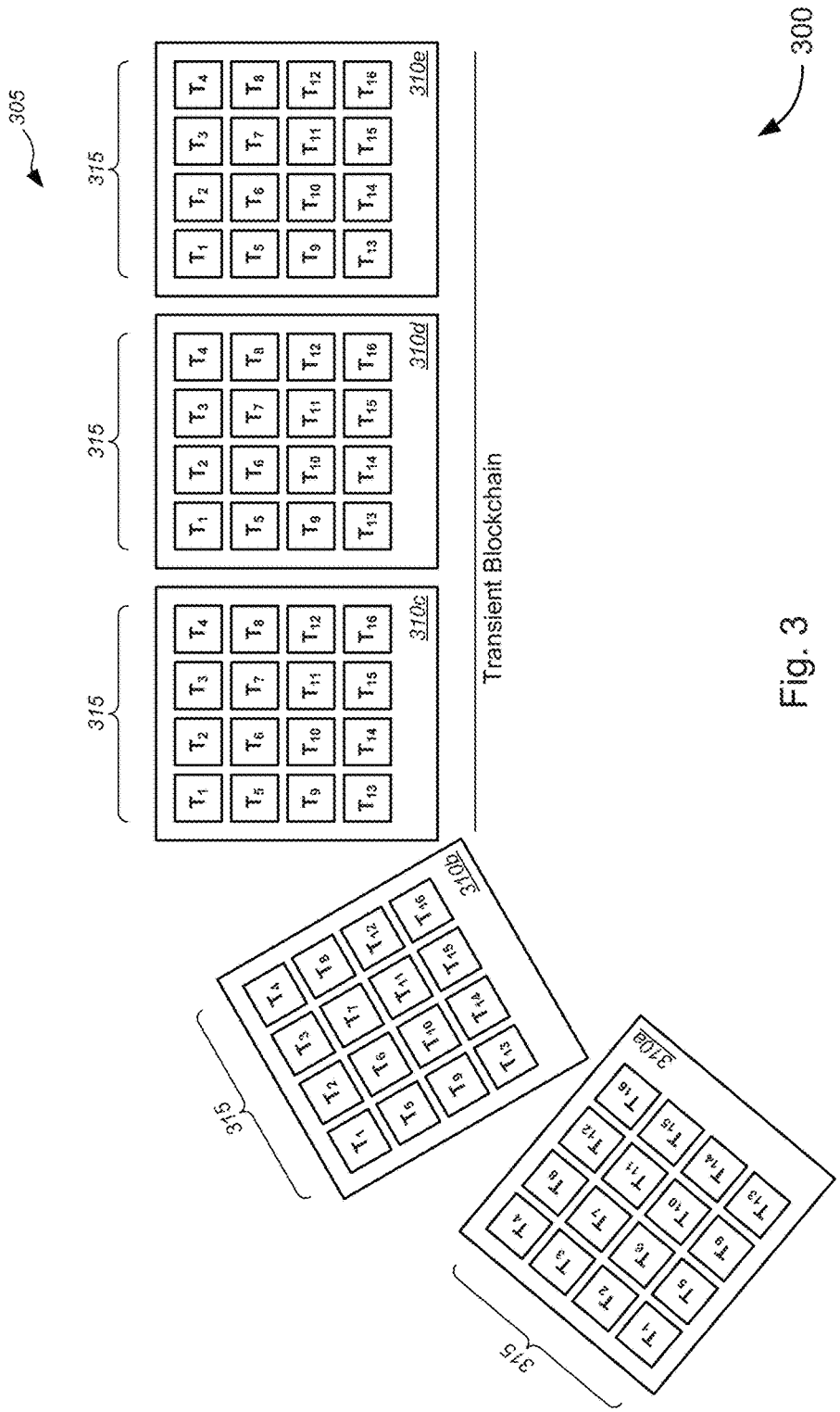
FIG. 3 is a schematic diagram illustrating a non-limiting example of a transient blockchain including a plurality of transactions, in accordance with various embodiments.

FIG. 3 is a schematic diagram illustrating a non-limiting example 300 of a transient blockchain including a plurality of transactions, in accordance with various embodiments.

With reference to FIG. 3, a blockchain 305 might comprise a plurality of blocks 310a-310e (collectively, "blocks 310" or the like), each block 310 containing a plurality of transaction slips $T_1$-$T_{16}$ 315, each of which might contain transaction information or information associated with a smart contract, or the like. Although only five blocks 310 are shown in the blockchain 305 in FIG. 3, the various embodiments are not so limited, and the blockchain 305 can comprise any suitable number of blocks 310, from less than 10 blocks, to dozens, to scores, to hundreds, to thousands, to tens of thousands, to hundreds of thousands, to millions, or more blocks. Although only 16 transaction slips 315 are shown in each block 310, the various embodiments are not so limited, and each block 310 might contain any suitable number of transaction slips 315, and might differ in number from one block 310 to another block 310. Although not shown, each block 310 might also contain other data as well as a coinbase or a golden ticket (the latter of which is described in greater detail in the '514, '912, '944, and '974 applications), a solution to a computational puzzle (or a solution to the golden ticket), and/or the like.

Typical or conventional blockchains (such as shown in FIG. 2), due to the nature of their permanent ledgers, will eventually increase in number to span thousands, tens of thousands, hundreds of thousands, millions, or more blocks, which would result in a number of problems or issues including, but not limited to, at least one of: a slowdown in validation of the conventional blockchains, an increase in the costs of storing such large conventional blockchains, an increase in the costs of maintaining copies of such large conventional blockchains throughout a blockchain network, an increase in the demand for processing power, an increase in the processing time, and/or the like.

To address these problems or issues with typical or conventional blockchains or blockchain systems, as depicted in FIG. 3, the blockchain system in accordance with various embodiments (such as blockchain 305 or the like) might utilize transient blockchain functionality, which might include pruning, dropping, or pushing off one or more older blocks within the transient blockchain 305. In some cases, the one or more older blocks being pruned, dropped, or pushed off might precede an identified block in the transient blockchain 305. According to some embodiments, although not shown, the blocks preceding the identified block might number one of at least 10000 blocks, at least 50000 blocks, or at least 100000 blocks, or more blocks, and the like, or might be any block after the first block in the blockchain.

In the transient blockchain 305, a certain number of blocks may be maintained as actively on-ledger while older blocks are simply discarded. Payment slips and other data that is contained in blocks that have fallen off the tail-end of the chain can no longer be referenced in new transactions through the consensus mechanisms of the blockchain, such as a transaction slip in a previous block being used as an input to a new transaction. The simplest version of this is to maintain only a set of number of blocks in the blockchain, however, more complicated variants are possible—the strict requirement is just that all nodes to come to an agreement when adding new data to the chain about what old data may be pruned from the blockchain. Note that none of the transactions in this system are automatically rebroadcast. All attempts to keep data on the blockchain require manual intervention by the originators of the transactions or their authorized agents who must monitor the blockchain and take action to ensure their transactions, contracts, or data do not fall off the chain.

In the example of FIG. 3, blocks 310a and 310b, each containing transaction slips 315, are shown to be pruned, dropped, or pushed off from the blockchain 305. In this non-limiting example, the identified block might be the third or fourth block 310c or 310d of the blockchain 305, or the like. Although only two blocks 310 are shown as being pruned, dropped, or pushed off from the blockchain 305 in FIG. 3, the various embodiments are not so limited, and any suitable number or ones of the blocks in the transient blockchain 305 may be pruned, dropped, or pushed off from the blockchain 305. For example, in some cases, one or more random blocks in the blockchain 305 preceding the identified block might be pruned, dropped, or pushed off from the blockchain 305 (not shown). Alternatively, every $N^{th}$ block in the blockchain 305 preceding the identified block might be pruned, dropped, or pushed off from the blockchain 305, where N might equal a predetermined integer value (not shown). Alternatively, all the blocks in the blockchain 305 preceding the identified block might be pruned, dropped, or pushed off from the blockchain 305 (not shown).

Figure 4A:
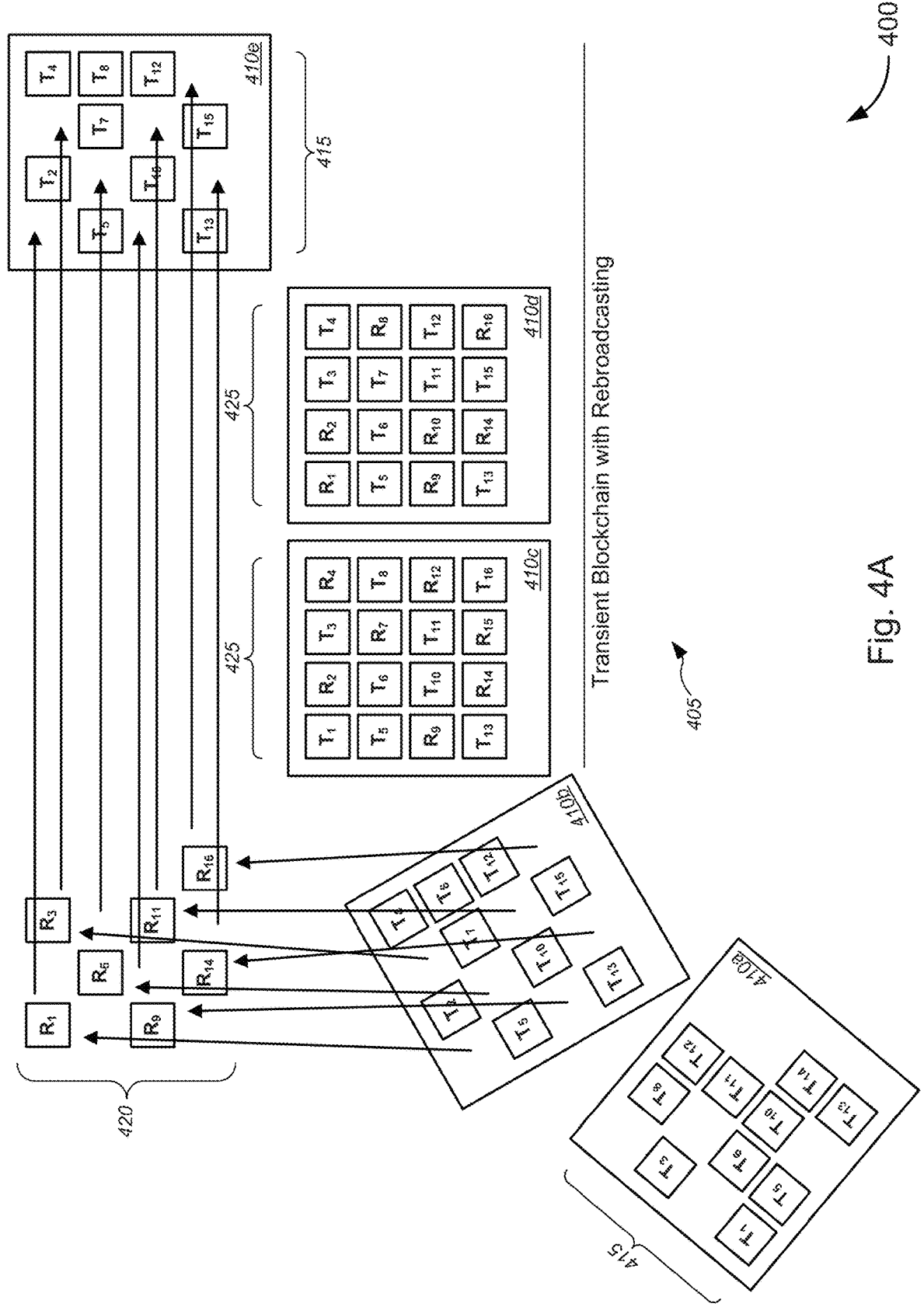
FIGS. 4A and 4B are schematic diagrams illustrating a non-limiting example of transaction rebroadcasting for a transient blockchain, in accordance with various embodiments.
Figure 4B:
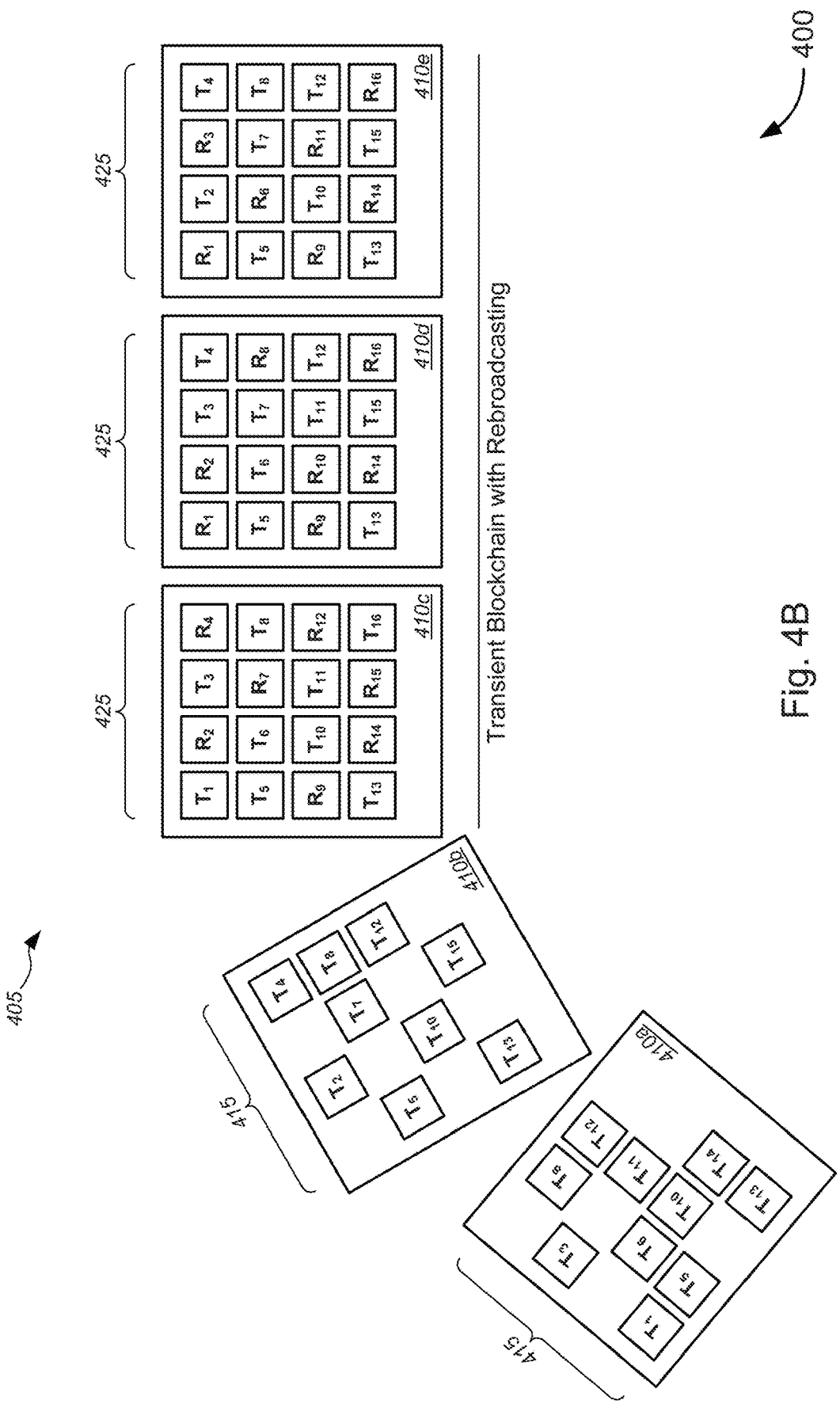

FIGS. 4A and 4B (collectively, "FIG. 4") are schematic diagrams illustrating a non-limiting example 400 of transaction rebroadcasting for a transient blockchain, in accordance with various embodiments.

With reference to FIG. 4, a blockchain 405 might comprise a plurality of blocks 410a-410e (collectively, "blocks 410" or the like), each block 410 containing a plurality of transaction slips $T_1$-$T_{16}$ 415, each of which might contain transaction information or information associated with a smart contract, or the like. Although only five blocks 410 are shown in the blockchain 405 in FIG. 4, the various embodiments are not so limited, and the blockchain 405 can comprise any suitable number of blocks 410, from less than 10 blocks, to dozens, to scores, to hundreds, to thousands, to tens of thousands, to hundreds of thousands, to millions, or more blocks. Although only up to a maximum of 16 transaction slips 415 are shown in each block 410, the various embodiments are not so limited, and each block 410 might contain any suitable number of transaction slips 415, and might differ in number from one block 410 to another block 410. Although not shown, each block 410 might also contain other data as well as a coinbase or a golden ticket (the latter of which is described in greater detail in the '514, '912, '944, and '974 applications), a solution to a computational puzzle (or a solution to the golden ticket), and/or the like.

Typical or conventional blockchains (such as shown in FIG. 2), due to the nature of their permanent ledgers, will eventually increase in number to span thousands, tens of thousands, hundreds of thousands, millions, or more blocks, which would result in a number of problems or issues including, but not limited to, at least one of: a slowdown in validation of the conventional blockchains, an increase in the costs of storing such large conventional blockchains, an increase in the costs of maintaining copies of such large conventional blockchains throughout a blockchain network, an increase in the demand for processing power, an increase in the processing time, and/or the like.

To address these problems or issues with typical or conventional blockchains or blockchain systems, as depicted in FIG. 4, the blockchain system in accordance with various embodiments (such as blockchain 405 or the like) might utilize transient blockchain functionality, which might include pruning, dropping, or pushing off one or more older blocks within the transient blockchain 405. In some cases, the one or more older blocks being pruned, dropped, or pushed off might precede an identified block in the transient blockchain 405. According to some embodiments, although not shown, the blocks preceding the identified block might number one of at least 10000 blocks, at least 50000 blocks, or at least 100000 blocks, or more blocks, and the like, or might be any block after the first block in the blockchain.

While transient blockchains address the problems or issues of typical or conventional blockchains (such as shown in FIG. 2), blocks that have been pruned, dropped, or pushed off might contain one or more transaction slips that should not be lost (or deleted) or that might otherwise satisfy criteria for rebroadcasting. In some embodiments, the criteria for rebroadcasting might include, without limitation, at least one of whether transactions or transaction slips have been spent, whether data associated with a transaction is of a predetermined size, whether transaction slips are addressed to one or more specific addresses, whether transaction slips contain more than a set number of tokens, whether transaction slips contain unspent tokens having a value greater than a predetermined amount or an amount specified in consensus rules of the blockchain, whether transactions are associated with credit stored elsewhere in the blockchain that may be deducted to pay an associated fee, or whether a transaction containing transaction slips is one of a specific type of transaction including, but not limited to, one of a golden ticket transaction, a VIP transaction, or a normal transaction, and/or the like.

Because typical or conventional blockchains (such as shown in FIG. 2) are permanent-ledger-based blockchains rather than transient blockchains, rebroadcasting of pruned transaction slips would not even be considered for such typical or conventional blockchains.

In the example of FIG. 4A, blocks 410a and 410b, each containing transaction slips 415, are shown to be pruned, dropped, or pushed off from the blockchain 405. In this non-limiting example, the identified block might be the third or fourth block 410c or 410d of the blockchain 405, or the like. Although only two blocks 410 are shown as being pruned, dropped, or pushed off from the blockchain 405 in FIG. 4, the various embodiments are not so limited, and any suitable number or ones of the blocks in the transient blockchain 405 may be pruned, dropped, or pushed off from the blockchain 405. For example, in some cases, one or more random blocks in the blockchain 405 preceding the identified block might be pruned, dropped, or pushed off from the blockchain 405 (not shown). Alternatively, every $N^{th}$ block in the blockchain 405 preceding the identified block might be pruned, dropped, or pushed off from the blockchain 405, where N might equal a predetermined integer value (not shown). Alternatively, all the blocks in the blockchain 405 preceding the identified block might be pruned, dropped, or pushed off from the blockchain 405 (not shown).

Also shown in FIG. 4A, some of the transaction slips 415 in each pruned block 410a and 410b might not satisfy the criteria for rebroadcasting (e.g., transactions slips $T_1, T_3, T_5, T_6, T_8, T_{10}, T_{11}, T_{12}, T_{13}$, and $T_{14}$, or the like of block 410a or transactions slips $T_2, T_4, T_5, T_7, T_8, T_{10}, T_{12}, T_{13}$, and $T_{15}$, or the like of block 410b, or the like). Correspondingly, some of the transaction slips 420 in each pruned block 410a and 410b might satisfy the criteria for rebroadcasting (e.g., rebroadcastable transaction slips $R_1, R_3, R_6, R_9, R_{11}, R_{14}$, and $R_{16}$, or the like of block 410b, or the like). As further shown in FIG. 4A, the transaction slips $R_1, R_3, R_6, R_9, R_{11}, R_{14}$, and $R_{16}$ 420 from pruned block 410b might be rebroadcast in a new block (like block 410e). Such rebroadcasting of transaction slips might result in blocks (such as blocks 410c and 410d) that contain both blocks 415 that do not satisfy the criteria for rebroadcasting and blocks 420 that do satisfy the criteria for rebroadcasting (e.g., transactions slips $T_1, T_3, T_5, T_6, T_8, T_{10}, T_{11}, T_{13}$, and $T_{16}$, or the like 415 and transactions slips $R_2, R_4, R_7, R_9, R_{12}, R_{14}$, and $R_{15}$, or the like 420 of block 410c, or transactions slips $T_3, T_4, T_5, T_6, T_7, T_{11}, T_{12}, T_{13}$, and $T_{15}$, or the like 415 and transactions slips $R_1, R_2, R_8, R_9, R_{10}, R_{14}$, and $R_{16}$, or the like 420 of block 410d, or the like)—that is, containing a combination 425 of transaction slips 415 and 420. In some cases, non-rebroadcastable transactions can include transactions or smart contracts that have been flagged as rebroadcastable but which lack the necessary funds or other conditions to be successfully rebroadcast.

Turning to FIG. 4B, after the transaction slips $R_1, R_3, R_6, R_9, R_{11}, R_{14}$, and $R_{16}$ 420 from pruned block 410b have been rebroadcast in new block 410e, resulting in a combination 425 of transaction slips 415 and 420, block 410e is broadcast together with the remainder of the unpruned blocks 410c and 410d of the blockchain 405. Although not shown, prior to inclusion in the blockchain 405, the transaction slips $R_1, R_3,$ $R_6, R_9, R_{11}, R_{14}$, and $R_{16}$ 420 are re-inserted into block 410e, and block 410e is produced and offered to one or more other nodes among the plurality of nodes in the peer-to-peer blockchain network for validation and inclusion in the blockchain 405. Pruning of the block 410b may occur during, simultaneous with (or concurrent with), or after the transaction slips $R_1, R_3, R_6, R_9, R_{11}, R_{14}$, and $R_{16}$ 420 are re-inserted into block 410e, and/or during, simultaneous with (or concurrent with), or after block 410e has been validated and included in the blockchain 405. Herein, as above, "re-including" might refer to transactions or transaction slips being inserted into a candidate block, which is then produced and offered to peer nodes in the blockchain network for validation and inclusion in the blockchain (where, in such validation process, the candidate block either may be deemed valid and subsequently included in the blockchain, or may be deemed invalid and not included in the blockchain), while "rebroadcasting" might refer to transactions or transaction slips being inserted into candidate blocks that have been deemed valid and have been included in the blockchain by the peer nodes.

It can be seen in FIG. 4 that the transactions that fulfill the conditions for rebroadcasting are never discarded—only transactions that do not fulfill rebroadcasting conditions are discarded. While the exact mechanism used to accomplish this is not shown in FIG. 4, the transactions from block 410b that meet the rebroadcasting criteria have been extracted from being discarded and are re-inserted into block 410e, and so on. Only the data that does not fit the rebroadcast criteria is permitted to fall off the chain. The rebroadcast data is updated to pay the rebroadcast fee and are inserted into the newest block being created for inclusion in the blockchain 405.

Shown in FIG. 4 are the operations of the transient blockchain with consensus-level rebroadcasting. It can be seen in FIG. 4 that when a new block is created, the block that it might push off the blockchain might be examined to find all transactions and other block data that meet the criteria for auto-rebroadcasting. Data that fulfills these conditions are inserted (or re-inserted) into the new candidate block by the node creating said block, with content altered in a way that can be deterministically verified to be valid according to the consensus rules of the blockchain. The new block is then added to the blockchain, and—provided it is valid—the new block takes its position at the end of the blockchain. This allows blocks to discard data—but not all data—at the same time that the new block is added to the blockchain, blocks then have the ability to discard older data.

Figure 5:
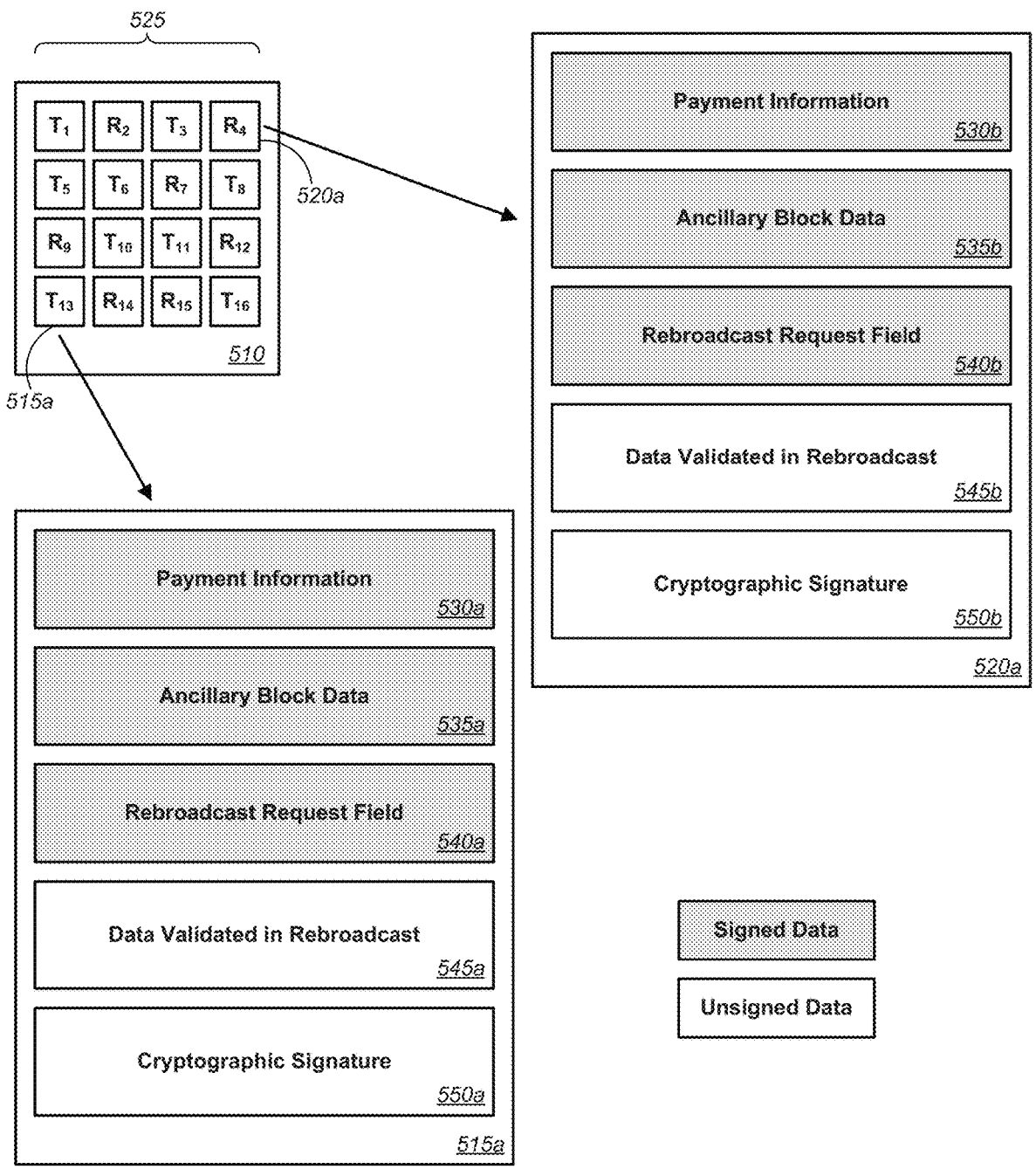
FIG. 5 is a schematic diagram illustrating non-limiting examples of structures of transactions contained in blocks of a transient blockchain, in accordance with various embodiments.

FIG. 5 is a schematic diagram illustrating non-limiting examples 500 of structures of transactions contained in blocks of a transient blockchain, in accordance with various embodiments.

In some embodiments, block 510 might comprise a combination 525 of non-rebroadcastable and rebroadcastable transaction slips 515 and 520, respectively. Although not shown in FIG. 5, the block 510 might be part of a blockchain. The blockchain can comprise any suitable number of blocks 510, from less than 10 blocks, to dozens, to scores, to hundreds, to thousands, to tens of thousands, to hundreds of thousands, to millions, or more blocks. Although only up to a maximum of 16 transaction slips 525 are shown in block 510, the various embodiments are not so limited, and block 510 might contain any suitable number of transaction slips 515, and might differ in number from one block to another block. Although not shown, block 510 might also contain other data as well as a coinbase or a golden ticket (the latter of which is described in greater detail in the '514, '912, '944, and '974 applications), a solution to a computational puzzle (or a solution to the golden ticket), and/or the like.

As shown in FIG. 5, some of the transaction slips 525 in block 510 might not satisfy the criteria for rebroadcasting (e.g., transactions slips $T_1$, $T_3$, $T_5$, $T_6$, $T_8$, $T_{10}$, $T_{11}$, $T_{13}$, and $T_{16}$, or the like), while some of the transaction slips 525 in block 510 might satisfy the criteria for rebroadcasting (e.g., rebroadcastable transaction slips $R_2$, $R_4$, $R_7$, $R_9$, $R_{12}$, $R_{14}$, and $R_{15}$, or the like). As an example, one of the non-rebroadcastable transaction slips $T_{13}$ 515a might have a structure comprising one or more data portions or data fields, including but not limited to, at least one of a payment information field 530a, an ancillary block data field 535a, a rebroadcast request field 540a, a data validated in rebroadcast field 545a, or a cryptographic signature field 550a, and/or the like. Similarly, one of the rebroadcastable transaction slips $R_4$ 520a might have a structure comprising one or more data portions or data fields, including but not limited to, at least one of a payment information field 530b, an ancillary block data field 535b, a rebroadcast request field 540b, a data validated in rebroadcast field 545b, or a cryptographic signature field 550b, and/or the like. In some embodiments, the payment information field 530a or 530b might each comprise payment information, including, but not limited to, at least one of unspent transaction output ("UTXO") slips, spent transaction slips, address information, payment or fee information, and/or the like. The ancillary block data field 535a or 535b might comprise optional ancillary data including, but not limited to, message data associated with a transaction, ancillary smart contract data, and/or the like. The ancillary data may further include, without limitation, at least one of a variable that stores information regarding a number of times that a transaction or its corresponding transaction slip has been rebroadcast, a type of rebroadcast fee that has been applied, or additional cryptographic signatures that can be used to reconstruct an original transaction from which the rebroadcast at least one transaction is sourced, and/or the like.

The rebroadcast request field 540a or 540b might comprise information or flag denoting that the particular transaction slip 515a or 520a should be rebroadcast or that the particular transaction slip 515a or 520a has been requested to be rebroadcast or that the particular transaction slip 515a or 520a has automatically been determined to be rebroadcast. In this case, the rebroadcast request field 540a of transaction slip $T_{13}$ 515a might contain information or flag denoting that the particular transaction slip 515a need not be rebroadcast should the transaction slip 515a be pruned, dropped, or pushed off from the blockchain. In contrast, the rebroadcast request field 540b of transaction slip $R_4$ 520a might contain information or flag denoting that the particular transaction slip 520a should be automatically rebroadcast should the transaction slip 520a be pruned, dropped, or pushed off from the blockchain.

The data validated in rebroadcast field 545a or 545b might comprise information or data that might be created during the rebroadcasting process, including, but not limited to, a variable to record the number of times that the transaction slip 515a or 520a has been rebroadcast or automatically rebroadcast. The information regarding the number of times that the transaction slip has been rebroadcast or automatically rebroadcast may be used for calculating the proper fee for any subsequent rebroadcasts as the fee may vary depending on how many times a transaction has been auto-broadcast and/or may be used for confirming the value of the present transaction. Extra data created during the rebroadcasting process can also be included in this field, in some cases, without breaking the cryptographic signature of the original transaction, which may be created without signing the data field.

The cryptographic signature field 550a or 550b might contain the cryptographic signature used to encode data contained in the transaction slip 515a or 520a. With reference to FIG. 5, the gray-shaded blocks (i.e., the payment information field 530a or 530b, the ancillary block data field 535a or 535b, the rebroadcast request field 540a or 540b, or the like) might contain data that has been cryptographically signed or encoded, while the unshaded blocks (i.e., the data validated in rebroadcast field 545a or 545b, a cryptographic signature field 550a or 550b, or the like) might contain unsigned data.

With reference to some of the signed data fields, the rebroadcast request field 540a or 540b might be signed to track whether the user wishes the system to automatically rebroadcast the transaction. It may be more efficient to simply check one variable than to perform fee calculations for all of the transactions falling off the transient blockchain. This field need not be signed if transaction rebroadcasting is set to be automatic; in some cases, this field need not even be necessary to be part of the structure of the transactions.

In a smart contract rebroadcasting system, the designers of the rebroadcasting mechanism may need to decide whether to update the original ancillary block data (e.g., breaking the validity of the signature) when rebroadcasting data. This would be less of an issue for Bitcoin-style transactions than Ethereum-style smart contracts where the entire updated state of the smart contract may need to be copied into the latest block (and updates to data stored in intermediary blocks may be necessary so that the system does not rebroadcast the full smart contract again following every subsequent transaction made with that smart contract until the revised smart contract is again ready to fall off the transient chain).

An important principle to note might be that the consensus layer of the blockchain enforces the validity of the data even if the cryptographic signatures relied upon by other blockchain designs become invalid because of data changes. As long as transactions might be auto-rebroadcast and the network nodes might individually check the validity of each rebroadcast when it happens, the system can be sure that any transaction that can be found on the blockchain is valid even if the cryptographic signature breaks after the first rebroadcast.

Figure 6:
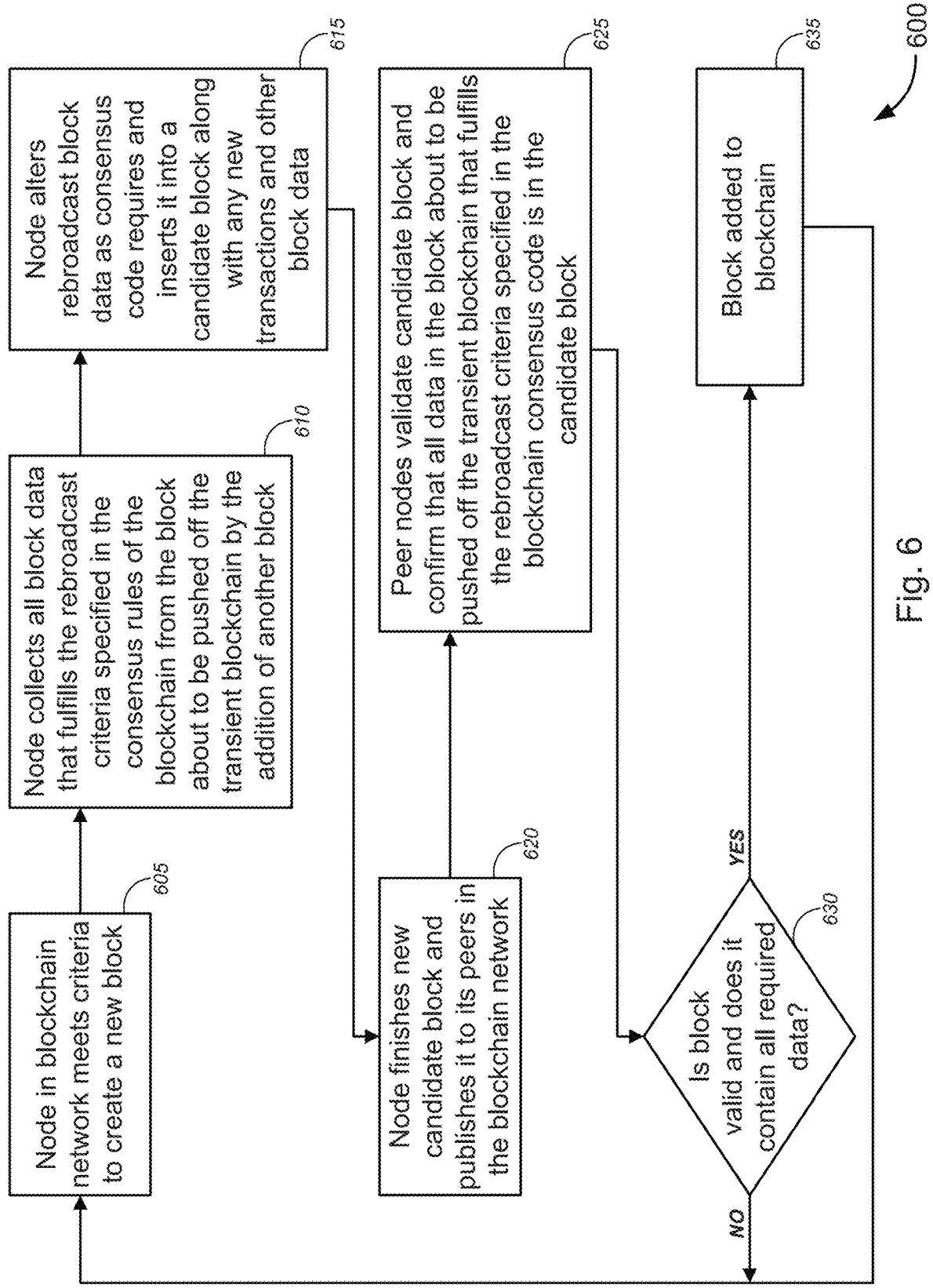
FIG. 6 is a block diagram illustrating a non-limiting example of transaction rebroadcasting for transient blockchains, in accordance with various embodiments.

FIG. 6 is a block diagram illustrating a non-limiting example 600 of a method for implementing transaction rebroadcasting for transient blockchains, in accordance with various embodiments.

With reference to FIG. 6, a node in the blockchain network might meet criteria to create a new block (block 605). At block 610, the node might collect all block data that fulfills the rebroadcast criteria specified in the consensus rules of the blockchain from the block about to be pushed off the transient blockchain by the addition of another block. The node might alter rebroadcast block data as consensus code requires and might insert it into a candidate block along with any new transactions and other block data (block 615), and might finish the new candidate block and might publish it to its peers in the blockchain network (block 620). At block 625, peer nodes might validate the candidate block and might confirm that all data in the block about to be pushed off the transient blockchain that fulfills the rebroadcast criteria specified in the blockchain consensus code is in the candidate block. A determination might be made as to whether the block is valid and whether it contains all required data (block 630). If not, the process returns to the process at block 605. If so, the block is added to the blockchain (block 635), and the process might subsequently return to the process at block 605.

Illustrated in FIG. 6 is a process in which the node that creates the new block, as well as the peers that confirm and validate the new block, might use to handle transaction rebroadcasting. If a block is produced that is determined to be invalid, it will not be added to the longest-chain of the blockchain because the majority of the nodes in the peer-to-peer network will not validate it and will continue to wait for a valid block that fulfills the necessary rebroadcasting conditions.

FIGS. 7A-7F (collectively, "FIG. 7") are flow diagrams illustrating a method 700 for implementing automatic transaction rebroadcasting for transient blockchains, in accordance with various embodiments. Method 700 of FIG. 7A continues onto FIG. 7B following the circular marker denoted, "A," and might continue from FIG. 7B onto FIG. 7C following the circular marker denoted, "B" and/or continue from FIG. 7B onto FIG. 7D following the circular marker denoted, "C." Method 700 of FIG. 7B might continue onto FIG. 7E following the circular marker denoted, "D."

While the techniques and procedures are depicted and/or described in a certain order for purposes of illustration, it should be appreciated that certain procedures may be reordered and/or omitted within the scope of various embodiments. Moreover, while the method 700 illustrated by FIG. 7 can be implemented by or with (and, in some cases, are described below with respect to) the systems, examples, or embodiments 100, 300, 400, 500, and 600 of FIGS. 1, 3, 4, 5, and 6, respectively (or components thereof), such methods may also be implemented using any suitable hardware (or software) implementation. Similarly, while each of the systems, examples, or embodiments 100, 300, 400, 500, and 600 of FIGS. 1, 3, 4, 5, and 6, respectively (or components thereof), can operate according to the method 700 illustrated by FIG. 7 (e.g., by executing instructions embodied on a computer readable medium), the systems, examples, or embodiments 100, 300, 400, 500, and 600 of FIGS. 1, 3, 4, 5, and 6 can each also operate according to other modes of operation and/or perform other suitable procedures In the non-limiting embodiment of FIG. 7A, method 700, at block 702, might comprise identifying, with a first node among a plurality of nodes in a peer-to-peer blockchain network, at least one of one or more transactions or one or more transaction slips in at least one block preceding an identified block in a blockchain. In some embodiments, the at least one transaction slip might have a data structure including, without limitation, at least one of payment information, ancillary block data, rebroadcast request field, data that is validated in rebroadcast, or a cryptographic signature, and/or the like.

At block 704, method 700 might comprise determining, with the first node, whether each of the identified at least one of the one or more transactions or the one or more transaction slips satisfies one or more criteria for rebroadcasting. If not, the process continues to block 706. If so, the process continues to block 708. According to some embodiments, the one or more criteria for rebroadcasting transactions or transaction slips might include, but are not limited to, at least one of whether a transaction or a transaction slip has been spent, whether data associated with a transaction is of a predetermined size, whether a transaction slip is addressed to one or more specific addresses, whether a transaction slip contains more than a set number of tokens, whether a transaction slip contains unspent tokens having a value greater than an amount specified in consensus rules of the blockchain, whether a transaction is associated with credit stored elsewhere in the blockchain that may be deducted to pay an associated fee, or whether a transaction or its associated transaction slip is one of a specific type of transaction including one of a golden ticket transaction, a VIP transaction, or a normal transaction, and/or the like.

At block 706, method 700 might comprise, based on a determination that all transactions or all transaction slips in one or more blocks do not satisfy the one or more criteria for rebroadcasting, pruning, with the first node, the one or more blocks from the blockchain without rebroadcasting any of these transactions or transaction slips.

At optional block 708, according to some embodiments, method 700 might comprise, based on a determination that at least one transaction or at least one transaction slip among the identified at least one of the one or more transactions or the one or more transaction slips satisfies the one or more criteria for rebroadcasting, parsing, with the first node, the at least one transaction or the at least one transaction slip from other data contained in the at least one block.

Alternatively, or additionally, method 700 might comprise, based on a determination that at least one transaction or at least one transaction slip among the identified at least one of the one or more transactions or the one or more transaction slips satisfies the one or more criteria for rebroadcasting, re-including, with the first node, the at least one transaction or the at least one transaction slip in a subsequent candidate block that is produced and offered to one or more other nodes among the plurality of nodes in the peer-to-peer blockchain network for validation and inclusion in the blockchain (block 710). Method 700 might continue onto the process at block 712 in FIG. 7B following the circular marker denoted, "A."

Figure 7A:
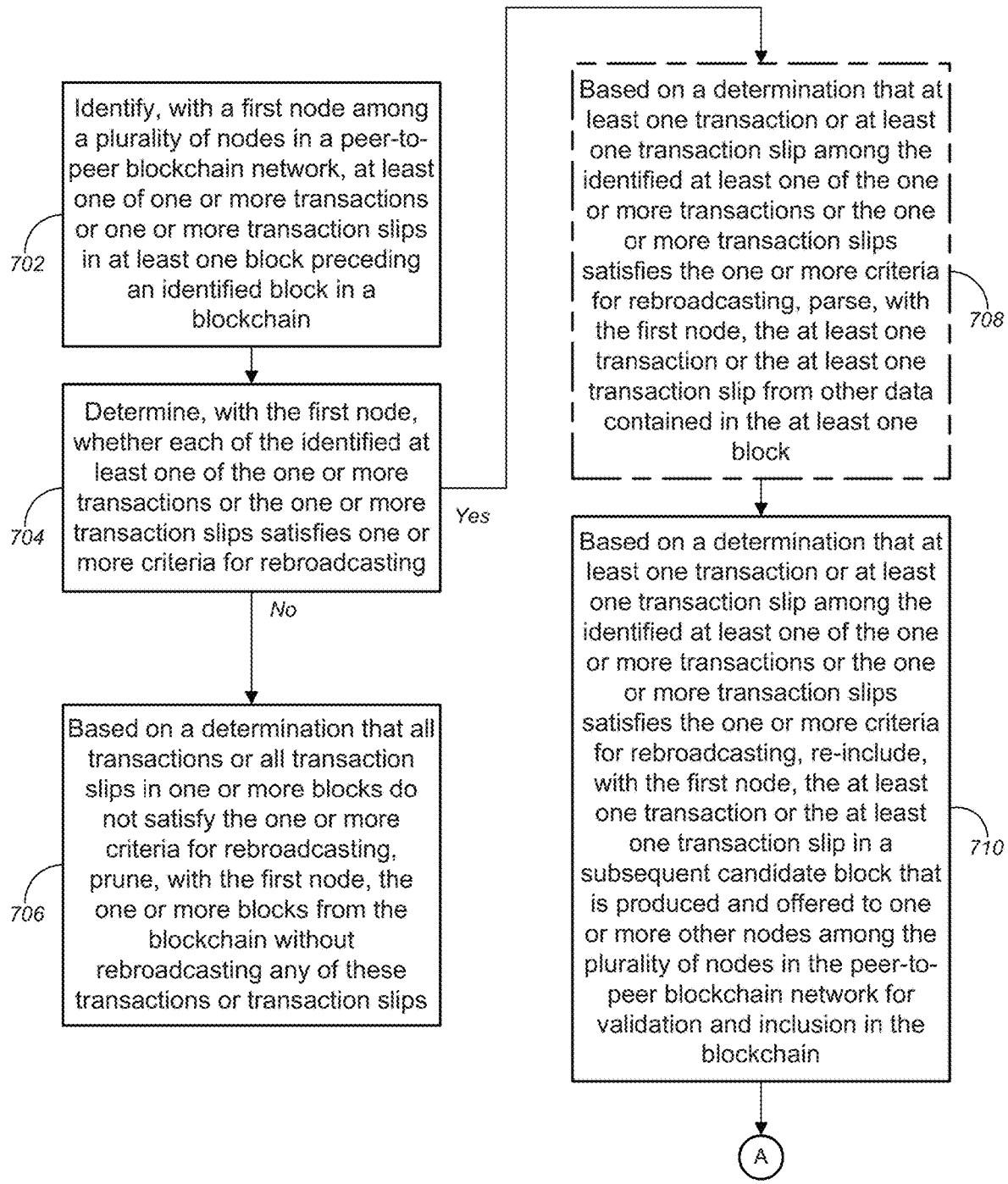
FIGS. 7A-7F are flow diagrams illustrating a method for implementing automatic transaction rebroadcasting for transient blockchains, in accordance with various embodiments.
Figure 7B:
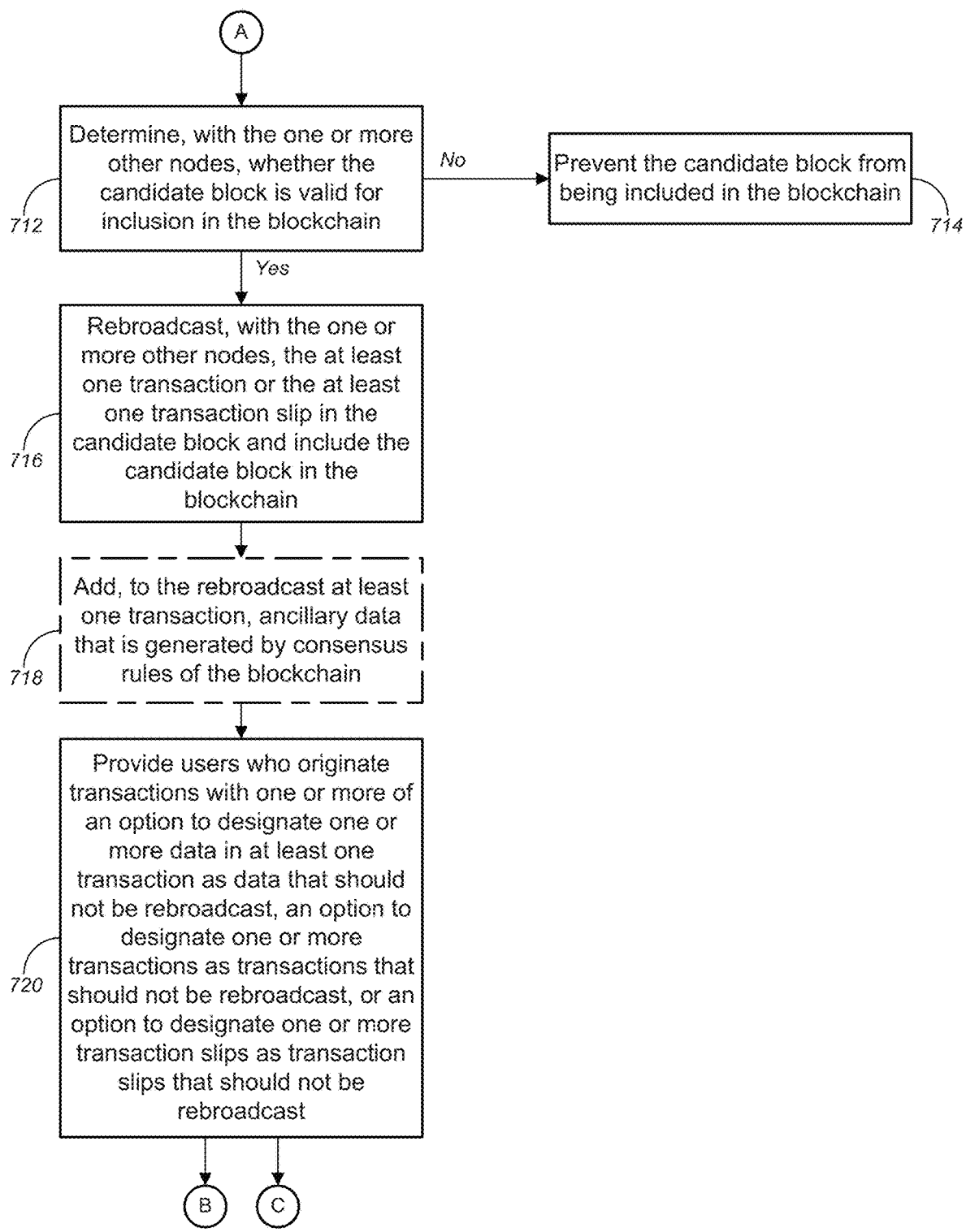

At block 712 in FIG. 7B (following the circular marker denoted, "A"), method 700 might comprise determining, with the one or more other nodes, whether the candidate block is valid for inclusion in the blockchain. If not, the process continues to block 714. If so, the process continues to block 716. At block 714, method 700 might comprise preventing the candidate block from being included in the blockchain. At block 716, method 700 might comprise rebroadcasting, with the one or more other nodes, the at least one transaction or the at least one transaction slip in the candidate block and including the candidate block in the blockchain. Method 700 might further comprise, at optional block 718, adding, to the rebroadcast at least one transaction, ancillary data that is generated by consensus rules of the blockchain. In some cases, the ancillary data might include, but is not limited to, at least one of a variable that stores information regarding a number of times that a transaction or its corresponding transaction slip has been rebroadcast, a type of rebroadcast fee that has been applied, or additional cryptographic signatures that can be used to reconstruct an original transaction from which the rebroadcast at least one transaction is sourced, and/or the like. According to some embodiments, method 700 might further comprise providing users who originate transactions with one or more of an option to designate one or more data in at least one transaction as data that should not be rebroadcast, an option to designate one or more transactions as transactions that should not be rebroadcast, or an option to designate one or more transaction slips as transaction slips that should not be rebroadcast (block 720). Method 700 might continue onto the process at block 722 in FIG. 7C following the circular marker denoted, "B," and/or might continue onto the process at block 734 in FIG. 7D following the circular marker denoted, "C."

Figure 7C:
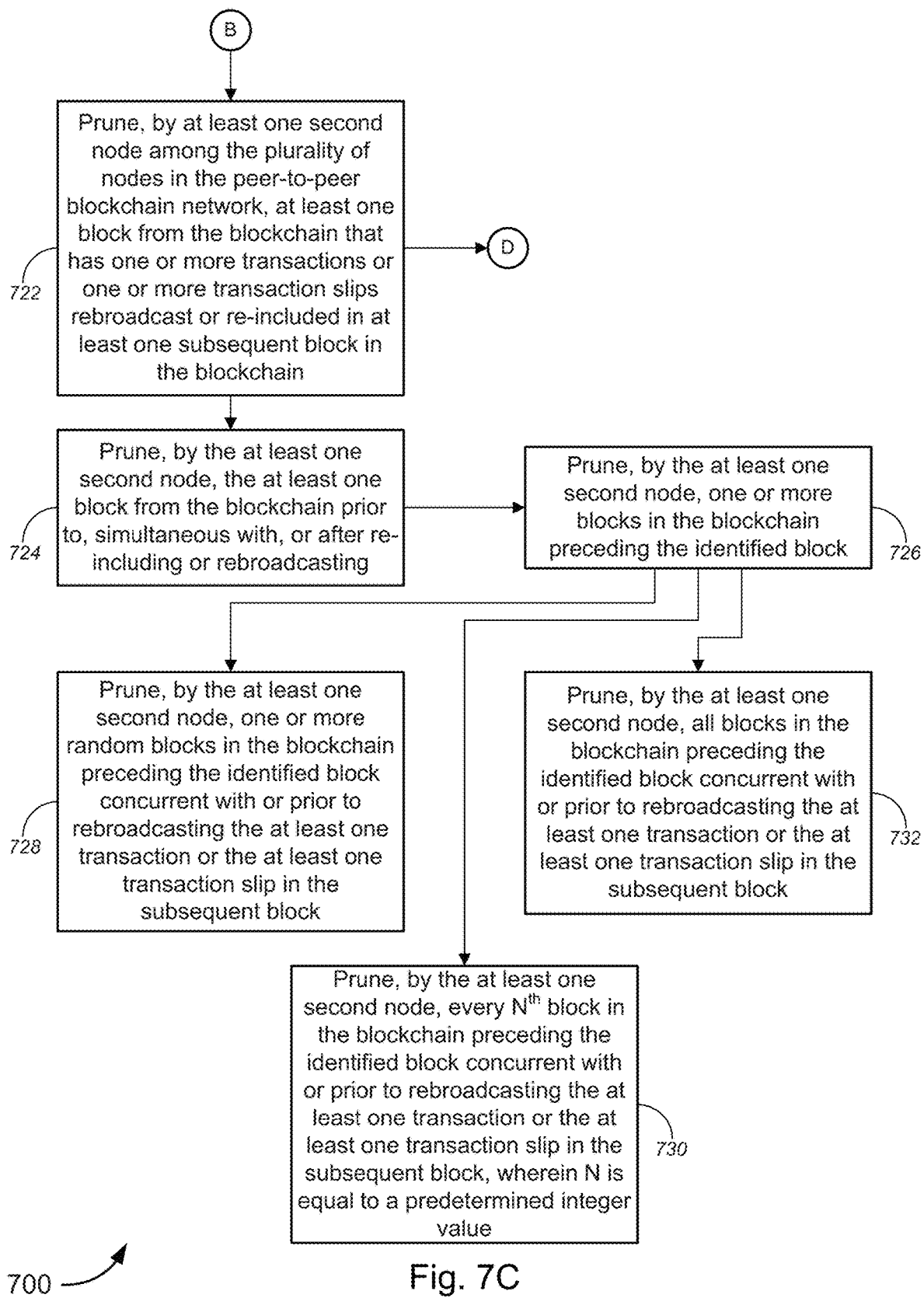

At block 722 in FIG. 7C (following the circular marker denoted, "B"), method 700 might comprise pruning, by at least one second node among the plurality of nodes in the peer-to-peer blockchain network, at least one block from the blockchain that has one or more transactions or one or more transaction slips rebroadcast or re-included in at least one subsequent block in the blockchain, to prevent the one or more transactions or the one or more transaction slips in the at least one block from being available as duplicate transactions or transaction slips that can be spent. The process might continue onto block 724 and/or might continue onto the process at block 738 in FIG. 7E following the circular marker denoted, "D."

In some embodiments, method 700 might comprise pruning, by the at least one second node, the at least one block from the blockchain prior to, simultaneously with, or after re-including or rebroadcasting (block 724). In other words, pruning of the at least one block might be performed during one of before the one or more transactions or the one or more transaction slips in the at least one block have been rebroadcast or re-included in at least one subsequent block in the blockchain, simultaneous with the one or more transactions or the one or more transaction slips in the at least one block being rebroadcast or re-included in at least one subsequent block in the blockchain, or after the one or more transactions or the one or more transaction slips in the at least one block have been rebroadcast or re-included in at least one subsequent block in the blockchain, or the like.

Method 700, at block 726, might comprise pruning, by the at least one second node, one or more blocks in the blockchain preceding the identified block. In some embodiments, pruning, with the first node, one or more blocks in the blockchain preceding the identified block might comprise one of pruning, by the at least one second node, one or more random blocks in the blockchain preceding the identified block concurrent with or prior to rebroadcasting the at least one transaction or the at least one transaction slip in the subsequent block (block 728); pruning, by the at least one second node, every $N^{th}$ block in the blockchain preceding the identified block concurrent with or prior to rebroadcasting the at least one transaction or the at least one transaction slip in the subsequent block, wherein N is equal to a predetermined integer value (block 730); or pruning, by the at least one second node, all blocks in the blockchain preceding the identified block concurrent with or prior to rebroadcasting the at least one transaction or the at least one transaction slip in the subsequent block (block 732); and/or the like. In some cases, the blocks preceding the identified block might number one of at least 10000 blocks, at least 50000 blocks, or at least 100000 blocks, or more.

Figures 7D, 7E:
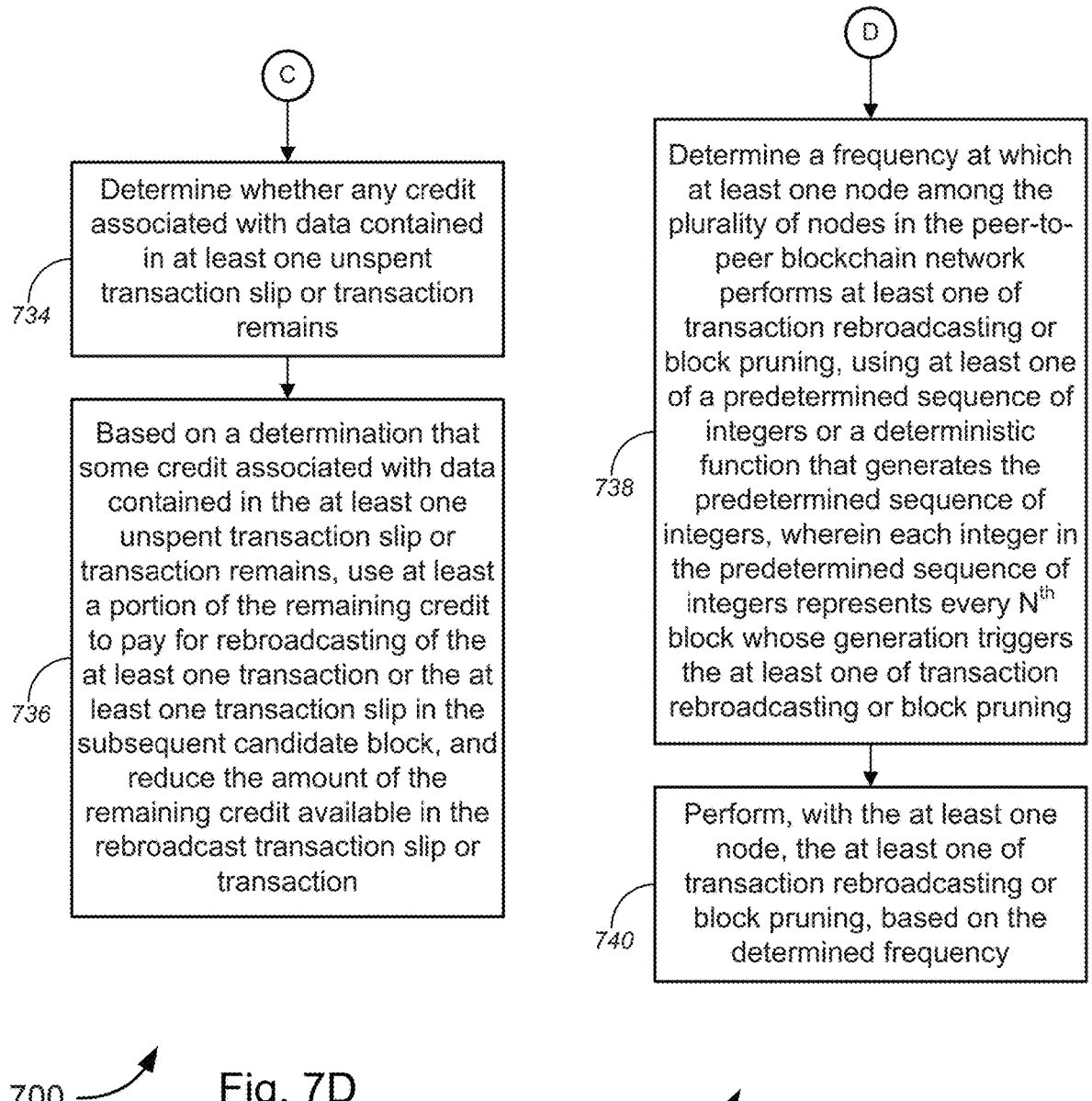

Method 700 might continue from FIG. 7B onto the process at block 734 in FIG. 7D following the circular marker denoted, "C." At block 734 in FIG. 7D (following the circular marker denoted, "C"), method 700 might comprise determining whether any credit associated with data contained in the at least one unspent transaction slip or transaction remains; and, based on a determination that some credit associated with data contained in the at least one unspent transaction slip or transaction remains, using at least a portion of the remaining credit to pay for rebroadcasting of the at least one transaction or the at least one transaction slip in the subsequent candidate block, and reducing the amount of the remaining credit available in the rebroadcast transaction slip or transaction (block 736).

Method 700 might continue from FIG. 7C onto the process at block 738 in FIG. 7E following the circular marker denoted, "D." At block 738 in FIG. 7E (following the circular marker denoted, "D"), method 700 might comprise determining a frequency at which at least one node among the plurality of nodes in the peer-to-peer blockchain network performs at least one of transaction rebroadcasting or block pruning, using at least one of a predetermined sequence of integers or a deterministic function that generates the predetermined sequence of integers, wherein each integer in the predetermined sequence of integers represents every $N^{th}$ block whose generation triggers the at least one of transaction rebroadcasting or block pruning. Method 700 might further comprise, at block 740, performing, with the at least one node, the at least one of transaction rebroadcasting or block pruning, based on the determined frequency.

Figure 7F:
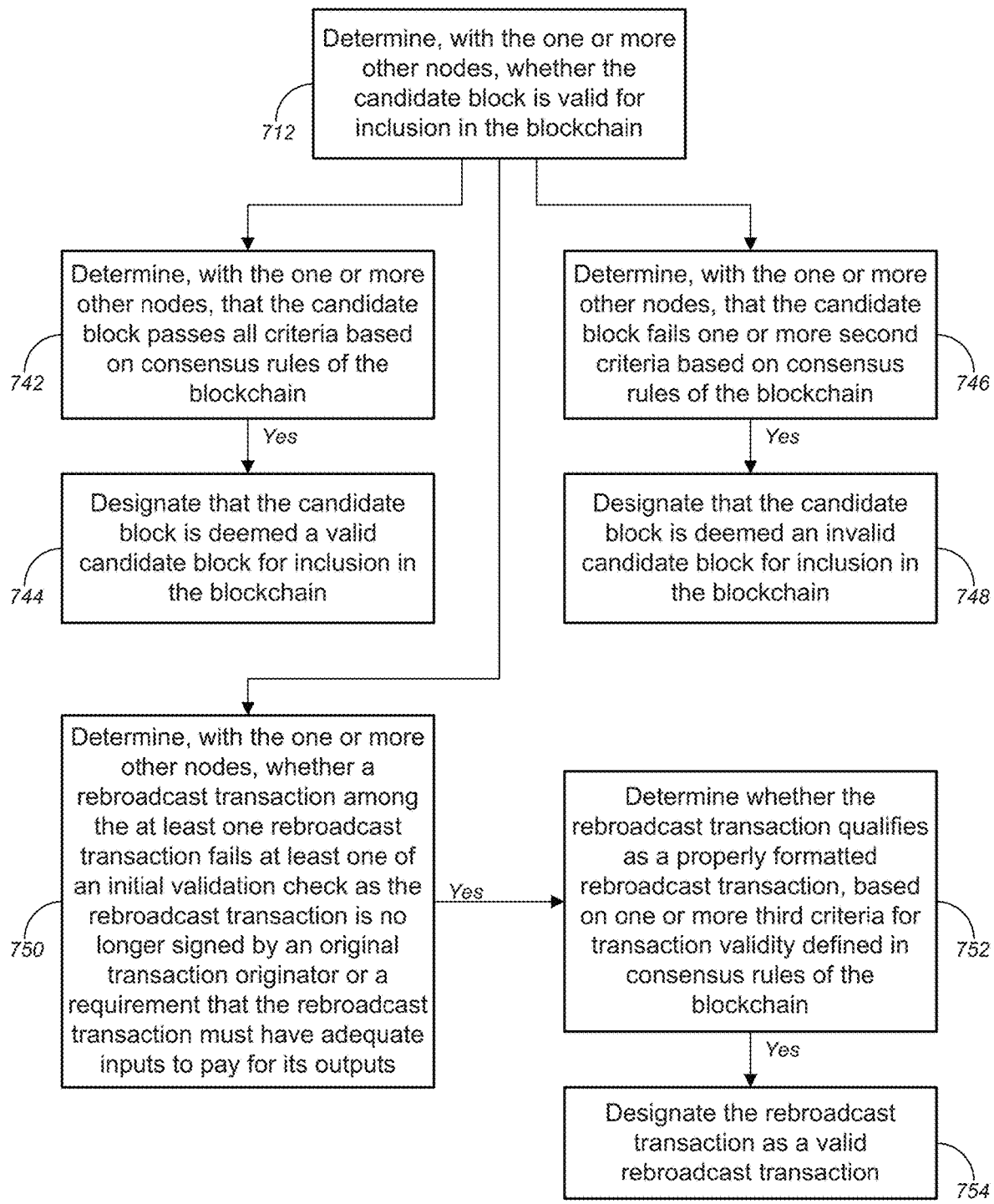

With reference to FIG. 7F, determining, with the one or more other nodes, whether the candidate block is valid for inclusion in the blockchain (at block 712 in FIG. 7B) might comprise determining, with the one or more other nodes, that the candidate block passes all criteria based on consensus rules of the blockchain (block 742). If so, method 700 might further comprise designating that the candidate block is deemed a valid candidate block for inclusion in the blockchain (block 744). Alternatively, determining, with the one or more other nodes, whether the candidate block is valid for inclusion in the blockchain (at block 712 in FIG. 7B) might comprise determining, with the one or more other nodes, that the candidate block fails one or more second criteria based on consensus rules of the blockchain (block 746). If so, method 700 might further comprise designating that the candidate block is deemed an invalid candidate block for inclusion in the blockchain (block 748). Alternatively, determining, with the one or more other nodes, whether the candidate block is valid for inclusion in the blockchain (at block 712 in FIG. 7B) might comprise determining, with the one or more other nodes, whether a rebroadcast transaction among the at least one rebroadcast transaction fails at least one of an initial validation check as the rebroadcast transaction is no long signed by an original transaction originator or a requirement that the rebroadcast transaction must have adequate inputs to pay for its outputs (block 750). If so, method 700 might further comprise determining, whether the rebroadcast transaction qualifies as a properly formatted rebroadcast transaction, based on one or more third criteria for transaction validity defined in consensus rules of the blockchain (block 752). If so, method 700 might further comprise designating the rebroadcast transaction as a valid rebroadcast transaction (block 754).

Exemplary System and Hardware Implementation

Figure 8:
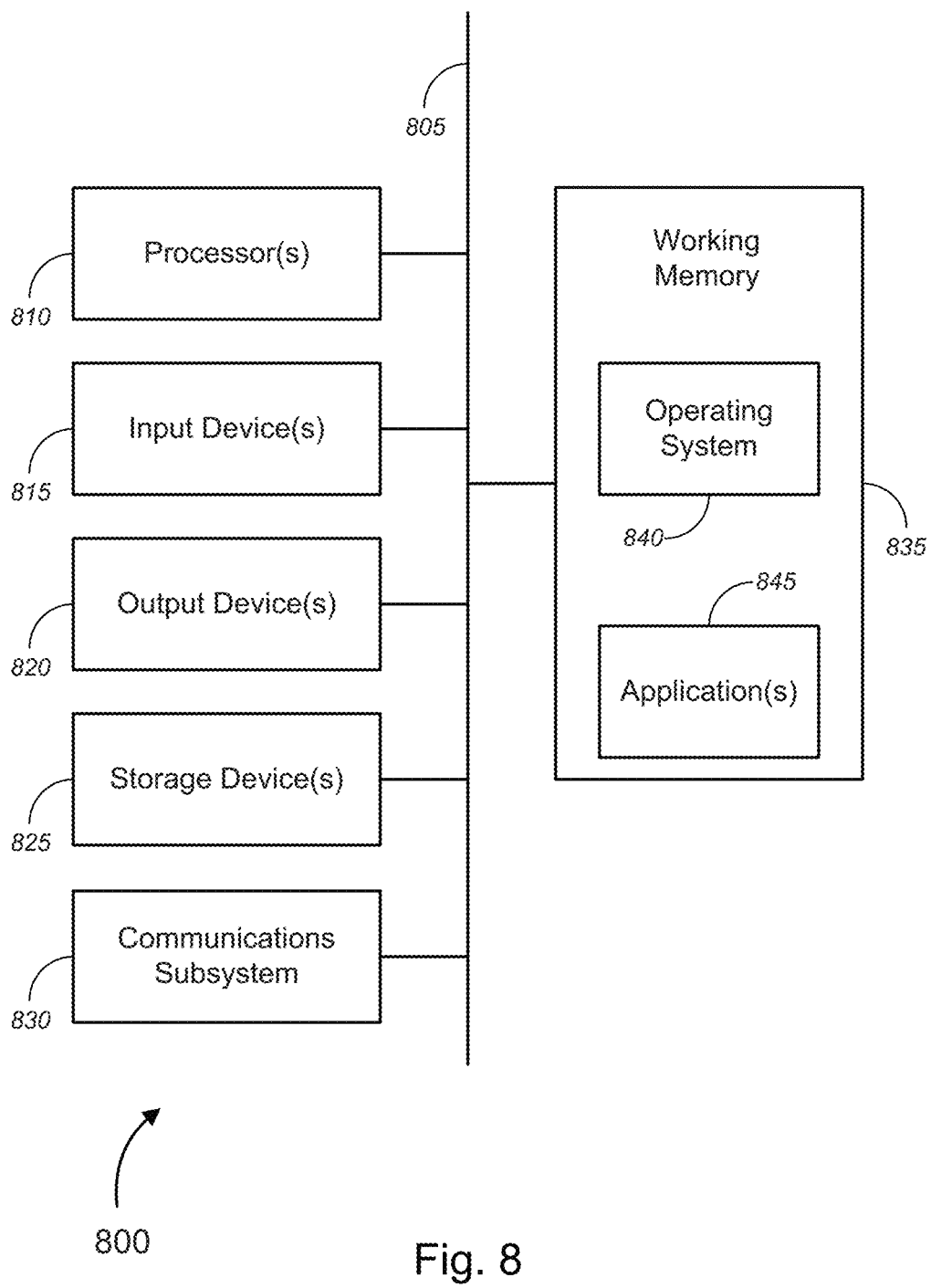
FIG. 8 is a block diagram illustrating an exemplary computer or system hardware architecture, in accordance with various embodiments.

FIG. 8 is a block diagram illustrating an exemplary computer or system hardware architecture, in accordance with various embodiments. FIG. 8 provides a schematic illustration of one embodiment of a computer system 800 of the service provider system hardware that can perform the methods provided by various other embodiments, as described herein, and/or can perform the functions of computer or hardware system (i.e., computing system 105, nodes 110, user devices 130a-130n and 135a-135n, etc.), as described above. It should be noted that FIG. 8 is meant only to provide a generalized illustration of various components, of which one or more (or none) of each may be utilized as appropriate. FIG. 8, therefore, broadly illustrates how individual system elements may be implemented in a relatively separated or relatively more integrated manner.

The computer or hardware system 800—which might represent an embodiment of the computer or hardware system (i.e., computing system 105, nodes 110, user devices 130a-130n and 135a-135n, etc.), described above with respect to FIGS. 1-7—is shown comprising hardware elements that can be electrically coupled via a bus 805 (or may otherwise be in communication, as appropriate). The hardware elements may include one or more processors 810, including, without limitation, one or more general-purpose processors and/or one or more special-purpose processors (such as microprocessors, digital signal processing chips, graphics acceleration processors, and/or the like); one or more input devices 815, which can include, without limitation, a mouse, a keyboard, and/or the like; and one or more output devices 820, which can include, without limitation, a display device, a printer, and/or the like.

The computer or hardware system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 800 might also include a communications subsystem 830, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 830 may permit data to be exchanged with a network (such as the network described below, to name one example), with other computer or hardware systems, and/or with any other devices described herein. In many embodiments, the computer or hardware system 800 will further comprise a working memory 835, which can include a RAM or ROM device, as described above.

The computer or hardware system 800 also may comprise software elements, shown as being currently located within the working memory 835, including an operating system 840, device drivers, executable libraries, and/or other code, such as one or more application programs 845, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a computer (or other device), in particular a general purpose computer, to perform one or more operations in accordance with the described methods.

A set of these instructions and/or code might be encoded and/or stored on a computer readable medium, in particular, a non-transitory computer readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and/or provided in an installation package, such that the storage medium can be used to program, configure, and/or adapt a computer such as a general purpose computer with the instructions/code stored thereon. These instructions might take the form of executable code, which is executable by the computer or hardware system 800 and/or might take the form of source and/or installable code, which, upon compilation and/or installation on the computer or hardware system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 800) to perform methods in accordance with various embodiments of the invention. According to a set of embodiments, some or all of the procedures of such methods are performed by the computer or hardware system 800 in response to processor 810 executing one or more sequences of one or more instructions (which might be incorporated into the operating system 840 and/or other code, such as an application program 845) contained in the working memory 835. Such instructions may be read into the working memory 835 from another computer readable medium, such as one or more of the storage device(s) 825. Merely by way of example, execution of the sequences of instructions contained in the working memory 835 might cause the processor(s) 810 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 800, various computer readable media might be involved in providing instructions/code to processor(s) 810 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 825. Volatile media includes, without limitation, dynamic memory, such as the working memory 835. In some alternative embodiments, a computer readable medium may take the form of transmission media, which includes, without limitation, coaxial cables, copper wire, and fiber optics, including the wires that comprise the bus 805, as well as the various components of the communication subsystem 830 (and/or the media by which the communications subsystem 830 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 800. These signals, which might be in the form of electromagnetic signals, acoustic signals, optical signals, and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

Figure 9:
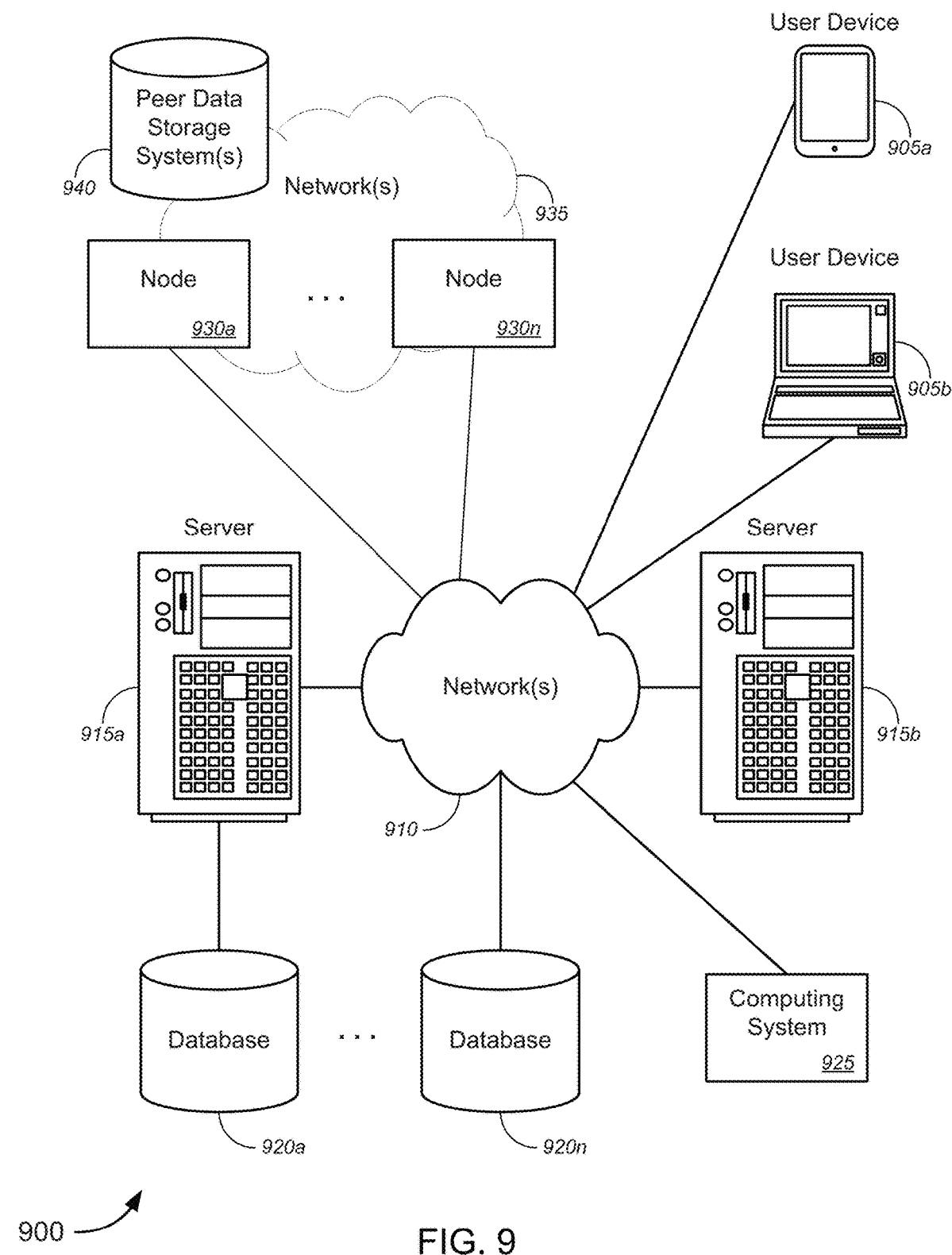
FIG. 9 is a block diagram illustrating a networked system of computers, computing systems, or system hardware architecture, which can be used in accordance with various embodiments.

As noted above, a set of embodiments comprises methods and systems for implementing blockchain transactions, and, more particularly, to methods, systems, and apparatuses for implementing automatic transaction rebroadcasting for transient blockchains. FIG. 9 illustrates a schematic diagram of a system 900 that can be used in accordance with one set of embodiments. The system 900 can include one or more user computers, user devices, or customer devices 905. A user computer, user device, or customer device 905 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 905 can also have any of a variety of applications, including one or more applications configured to perform methods provided by various embodiments (as described above, for example), as well as one or more office applications, database client and/or server applications, and/or web browser applications. Alternatively, a user computer, user device, or customer device 905 can be any other electronic device, such as a thin-client computer, Internet-enabled mobile telephone, and/or personal digital assistant, capable of communicating via a network (e.g., the network(s) 910 described below) and/or of displaying and navigating web pages or other types of electronic documents. Although the exemplary system 900 is shown with two user computers, user devices, or customer devices 905, any number of user computers, user devices, or customer devices can be supported.

Certain embodiments operate in a networked environment, which can include a network(s) 910. The network(s) 910 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 910 (similar to network(s) 120*a*-120*n*, 125, and 140*a*-140*n* of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 915. Each of the server computers 915 may be configured with an operating system, including, without limitation, any of those discussed above, as well as any commercially (or freely) available server operating systems. Each of the servers 915 may also be running one or more applications, which can be configured to provide services to one or more clients 905 and/or other servers 915.

Merely by way of example, one of the servers 915 might be a data server, a web server, a cloud computing device(s), or the like, as described above. The data server might include (or be in communication with) a web server, which can be used, merely by way of example, to process requests for web pages or other electronic documents from user computers 905. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 905 to perform methods of the invention.

The server computers 915, in some embodiments, might include one or more application servers, which can be configured with one or more applications accessible by a client running on one or more of the client computers 905 and/or other servers 915. Merely by way of example, the server(s) 915 can be one or more general purpose computers capable of executing programs or scripts in response to the user computers 905 and/or other servers 915, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 905 and/or another server 915. In some embodiments, an application server can perform one or more of the processes for implementing blockchain transactions, and, more particularly, to methods, systems, and apparatuses for implementing automatic transaction rebroadcasting for transient blockchains, as described in detail above. Data provided by an application server may be formatted as one or more web pages (comprising HTML, JavaScript, etc., for example) and/or may be forwarded to a user computer 905 via a web server (as described above, for example). Similarly, a web server might receive web page requests and/or input data from a user computer 905 and/or forward the web page requests and/or input data to an application server. In some cases, a web server may be integrated with an application server.

In accordance with further embodiments, one or more servers 915 can function as a file server and/or can include one or more of the files (e.g., application code, data files, etc.) necessary to implement various disclosed methods, incorporated by an application running on a user computer 905 and/or another server 915. Alternatively, as those skilled in the art will appreciate, a file server can include all necessary files, allowing such an application to be invoked remotely by a user computer, user device, or customer device 905 and/or server 915.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920a-920n (collectively, "databases 920"). The location of each of the databases 920 is discretionary: merely by way of example, a database 920a might reside on a storage medium local to (and/or resident in) a server 915a (and/or a user computer, user device, or customer device 905). Alternatively, a database 920n can be remote from any or all of the computers 905, 915, so long as it can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 920 can be a relational database, such as an Oracle database, that is adapted to store, update, and retrieve data in response to SQL-formatted commands. The database might be controlled and/or maintained by a database server, as described above, for example.

According to some embodiments, system 900 might further comprise a computing system 925 (similar to computing system 105 of FIG. 1, or the like), one or more nodes 930a-930n (collectively, "nodes 930" or the like; similar to nodes 110 of FIG. 1, or the like), network(s) 935 (similar to network(s) 120a-120n or 125 of FIG. 1, or the like), one or more peer data storage systems 940 (similar to peer data storage systems #1-#N $115_1$-$115_N$ of FIG. 1, or the like), and/or the like.

In operation, a first node 930 among the plurality of nodes 930 in the peer-to-peer blockchain network 935 might identify at least one of one or more transactions or one or more transaction slips in at least one block preceding an identified block in a blockchain. The first node 930 might determine whether each of the identified at least one of the one or more transactions or the one or more transaction slips satisfies one or more criteria for rebroadcasting. Based on a determination that at least one transaction or at least one transaction slip among the identified at least one of the one or more transactions or the one or more transaction slips satisfies the one or more criteria for rebroadcasting, the first node 930 might re-include the at least one transaction or the at least one transaction slip in a subsequent candidate block that is produced and offered to one or more other nodes among the plurality of nodes in the peer-to-peer blockchain network for validation and inclusion in the blockchain.

According to some embodiments, the one or more criteria for rebroadcasting transactions or transaction slips might include, without limitation, at least one of whether a transaction or a transaction slip has been spent, whether data associated with a transaction is of a predetermined size, whether a transaction slip is addressed to one or more specific addresses, whether a transaction slip contains more than a set number of tokens, whether a transaction slip contains unspent tokens having a value greater than an amount specified in consensus rules of the blockchain, whether a transaction is associated with credit stored elsewhere in the blockchain that may be deducted to pay an associated fee, or whether a transaction or its associated transaction slip is one of a specific type of transaction including one of a golden ticket transaction, a VIP transaction, or a normal transaction, and/or the like.

According to some embodiments, at least one second node 930 might prune at least one block from the blockchain that has one or more transactions or one or more transaction slips rebroadcast or re-included in at least one subsequent block in the blockchain, to prevent the one or more transactions or the one or more transaction slips in the at least one block from being available as duplicate transactions or transaction slips that can be spent. In some instances, pruning of the at least one block is performed during one of before the one or more transactions or the one or more transaction slips in the at least one block have been rebroadcast or re-included in at least one subsequent block in the blockchain, simultaneous with the one or more transactions or the one or more transaction slips in the at least one block being rebroadcast or re-included in at least one subsequent block in the blockchain, or after the one or more transactions or the one or more transaction slips in the at least one block have been rebroadcast or re-included in at least one subsequent block in the blockchain, and/or the like.

In some embodiments, the at least one second node 930 might prune one or more random blocks in the blockchain preceding the identified block concurrent with or prior to rebroadcasting the at least one transaction or the at least one transaction slip in the subsequent candidate block. Alternatively, the at least one second node 930 might prune every $N^{th}$ block in the blockchain preceding the identified block concurrent with or prior to rebroadcasting the at least one transaction or the at least one transaction slip in the subsequent candidate block, where N is equal to a predetermined integer value or to any suitable integer value. Alternatively, the at least one second node 930 might prune all blocks in the blockchain preceding the identified block concurrent with or prior to rebroadcasting the at least one transaction or the at least one transaction slip in the subsequent candidate block. In some instances, the blocks preceding the identified block might number one of at least 10000 blocks, at least 50000 blocks, or at least 100000 blocks, and/or the like.

In some embodiments, the first node 930, the at least one second node 930, or other node 930, or the computing system 925, and/or the like might determine whether any credit associated with data contained in the at least one unspent transaction slip remains. Based on a determination that some credit associated with data contained in the at least one unspent transaction slip remains, the first node 930, the at least one second node 930, or other node 930, or the computing system 925, and/or the like might use at least a portion of the remaining credit to pay for the rebroadcasting of the at least one unspent transaction slip in the subsequent block, and might reduce the amount of the remaining credit available in the rebroadcast transaction slip or transaction.

In alternative or additional operations, which are as described in detail in the '514, '912, '944, and '974 applications (which have already been incorporated herein by reference in their entirety for all purposes), the plurality of nodes 930 might propagate an unconfirmed transaction across at least one of the networks 935. The computing system 925 or a first node 930a among the plurality of nodes 930 might embed, into the unconfirmed transaction, a cryptographic signature and a network address that combines with other cryptographic signatures and network addresses that have been previously embedded in the unconfirmed transaction by one or more other nodes of the plurality of nodes in the blockchain network to create a chain of signatures that constitutes an independently-verifiable and unforgeable record of a routing path that the unconfirmed transaction takes as it propagates across the peer-to-peer blockchain network. The computing system 925 or a second node 930b (not shown) among the plurality of nodes 930 might validate the chain of signatures embedded in the transactions included in a block of a blockchain to confirm that the block itself is valid in accordance with a set of consensus rules of the blockchain.

In some embodiments, the computing system 925 or one or more third nodes 930c (not shown) among the plurality of nodes 930 might quantify a level of difficulty associated with producing a valid candidate block by reducing it to a burn fee, in accordance with a set of consensus rules of a blockchain. In some cases, the burn fee might be a cost denominated in a value of a token managed by the blockchain network. According to some embodiments, the computing system 925 or one or more third nodes 930c might quantify the value of one or more transactions being included in a candidate block by reducing it to a burn value, in accordance with the set of consensus rules of the blockchain. In some instances, the burn value might be a figure denominated in a value of a token managed by the blockchain network. In some embodiments, the computing system 925 or one or more third nodes 930c might determine whether a sum of individual burn values of the one or more transactions that are included in the candidate block is equal to or greater than the burn fee of the candidate block, in accordance with the set of consensus rules of the blockchain. Based on a determination that the sum of individual burn values of the one or more transactions that are included in the candidate block is equal to or greater than the burn fee of the candidate block, the computing system 925 or one or more third nodes 930c might determine that the candidate block is valid according to the set of consensus rules of the blockchain.

In some embodiments, at least a majority of the plurality of nodes 930 in the blockchain network 935 might determine whether aggregate burn values of the transactions included in a block are sufficient to pay for the burn fee required for production of a block. Based on a determination that the aggregate burn values of the transactions included in the block are sufficient to pay for the burn fee required for the production of the block, the at least a majority of the plurality of nodes 930 might determine that the block is valid and might include the block in a blockchain. In some instances, at least a portion of a difference in value between a burn value of a transaction included in a block and a burn fee needed to produce a block, as measured in the value of the token managed by the blockchain network, might be granted to a node among the plurality of nodes that produces the block as a form of payment for producing the block. In some cases, at least a portion of the burn value of the one or more transactions included in the candidate block might be removed from circulation and not transferred to a node that produced the candidate block.

According to some embodiments, the computing system 925 or one or more fourth nodes 930d (not shown) among the plurality of nodes 930 within the blockchain network 935 might prune transaction slips in blocks in a blockchain preceding an arbitrary block identified according to consensus rules of the blockchain, and might calculate a value of all unspent tokens contained in all unpruned blocks preceding and including the last block being pruned. The computing system 925 or at least one node among the plurality of nodes 930 might adjust a monetary policy of the blockchain network so that the blockchain network would reintroduce the unspent tokens as tokens allocated in future blocks. In some cases, the unspent tokens might be reintroduced back into the blockchain network in a later block through use of golden tickets.

In some embodiments, the computing system 925 or a fifth node 930e (not shown) among the plurality of nodes 930 in the blockchain network might generate a golden ticket that contains a computational puzzle. The computing system 925 or a sixth node 930f (not shown) among the plurality of nodes 930 in the blockchain network might generate a solution to the computational puzzle in the golden ticket, where the solution to the computational puzzle might be used to select one or more network nodes among the plurality of nodes 930 in the blockchain network, in a manner that cannot be anticipated by the computing system 925 or the fifth node 930e generating the golden ticket. In some instances, at least two of the first node 930a, the second node 930b, the third node 930c, the fourth node 930d, the fifth node 930e, the sixth node 930f, and/or the computing system 925 might be the same node. Alternatively, the first node 930a, the second node 930b, the third node 930c, the fourth node 930d, the fifth node 930e, the sixth node 930f, and/or the computing system 925 might be different nodes. In some embodiments, the golden ticket might be at least one of included in a block published for inclusion in a blockchain or automatically associated with the block, and/or the like. In some cases, the golden ticket might include, without limitation, a random number that is created using data associated with the block. In some instances, the random number might comprise a cryptographic hash of data content contained within the block. In some cases, the solution to the golden ticket might be included in a block immediately following the block in which the golden ticket is included was published. In some instances, any valid blockchain might contain one or more golden tickets, each of which may be solved only once.

These and other functions of the system 900 (and its components) are described in greater detail above with respect to FIGS. 1-7.

In the present disclosure, "nodes" can be considered "computer nodes," "lucky miners" can be considered "solution-providing miners," "lucky nodes" can be considered "solution-selected nodes," a "vote of the block" can be considered a "variable embedded in the block," a "vote of the golden ticket" can be considered a "variable embedded in the golden ticket," a "vote of the transaction" can be considered a "variable embedded in the transaction," and a "golden ticket" can be considered a data structure containing a computational puzzle to be solved by solution-providing miners, the solution being used to select network nodes in the blockchain as described above.

The accompanying method claims can be considered computer-implemented methods.

Although the accompanying claims are presented with single dependencies, this is to satisfy the requirements of certain jurisdictions. Unless it is clear that the features are presented as incompatible alternatives, the features of any dependent claim can be combined with those of any one or more dependent claims before it, together with the features of the independent claim upon which these dependent claims depend. In other words, the dependent claims can be combined as if they contain multiple dependencies, as are allowed in some jurisdictions, and multiple dependencies may be inserted in the dependent claims.

One aspect provides a computer readable medium comprising computer executable instructions which, when executed by a computer, cause the computer to perform the method of any of the accompanying method claims or a relevant part of the method.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
identifying, with a first node among a plurality of nodes in a peer-to-peer blockchain network, at least one of one or more transactions or one or more transaction slips in at least one block preceding an identified block in a blockchain;
determining, with the first node, whether each of the identified at least one of the one or more transactions or the one or more transaction slips satisfies one or more criteria for rebroadcasting; and
based on a determination that at least one transaction or at least one transaction slip among the identified at least one of the one or more transactions or the one or more transaction slips satisfies the one or more criteria for rebroadcasting, re-including, with the first node, the at least one transaction or the at least one transaction slip in a subsequent candidate block that is produced and offered to one or more other nodes among the plurality of nodes in the peer-to-peer blockchain network for validation and inclusion in the blockchain.

2. The method of claim 1, further comprising:
pruning, by at least one second node among the plurality of nodes in the peer-to-peer blockchain network, at least one block from the blockchain that has one or more transactions or one or more transaction slips rebroadcast or re-included in at least one subsequent block in the blockchain, to prevent the one or more transactions or the one or more transaction slips in the at least one block from being available as duplicate transactions or transaction slips that can be spent.

3. The method of claim 2, wherein pruning of the at least one block is performed during one of before the one or more transactions or the one or more transaction slips in the at least one block have been rebroadcast or re-included in at least one subsequent block in the blockchain, simultaneous with the one or more transactions or the one or more transaction slips in the at least one block being rebroadcast or re-included in at least one subsequent block in the blockchain, or after the one or more transactions or the one or more transaction slips in the at least one block have been rebroadcast or re-included in at least one subsequent block in the blockchain.

4. The method of claim 1, further comprising:
determining, with at least one third node among the plurality of nodes in the peer-to-peer blockchain network, whether a candidate block fails one or more second criteria based on consensus rules of the blockchain, the one or more second criteria comprising at least one of that a candidate block must contain all rebroadcast data that the one or more criteria for rebroadcasting require to be included in a block, that a candidate block must contain accurate rebroadcast data, and that a candidate block must not contain additional rebroadcast data that is not eligible for rebroadcasting according to the one or more criteria for rebroadcasting; and
based on a determination that the candidate block fails one or more second criteria, designating, with the at least one third node, that the candidate block is deemed an invalid candidate block for inclusion in the blockchain.

5. The method of claim 1, further comprising:
determining a frequency at which at least one fourth node among the plurality of nodes in the peer-to-peer blockchain network performs at least one of transaction rebroadcasting or block pruning, using at least one of a predetermined sequence of integers or a deterministic function that generates the predetermined sequence of integers, wherein each integer in the predetermined sequence of integers represents every $N^{th}$ block whose generation triggers the at least one of transaction rebroadcasting or block pruning; and performing, with the at least one fourth node, the at least one of transaction rebroadcasting or block pruning, based on the determined frequency.

6. The method of claim 1, wherein the one or more criteria for rebroadcasting transactions or transaction slips comprise at least one of whether a transaction or a transaction slip has been spent, whether data associated with a transaction is of a predetermined size, whether a transaction slip is addressed to one or more specific addresses, whether a transaction slip contains more than a set number of tokens, whether a transaction slip contains unspent tokens having a value greater than an amount specified in consensus rules of the blockchain, whether a transaction is associated with credit stored elsewhere in the blockchain that may be deducted to pay an associated fee, or whether a transaction or its associated transaction slip is one of a specific type of transaction including one of a golden ticket transaction, a VIP transaction, or a normal transaction.

7. The method of claim 1, wherein re-including, with the first node, the at least one transaction or the at least one transaction slip in a subsequent candidate block comprises creating one or more of at least one new transaction or at least one new transaction slip that re-formats rebroadcast data in accordance with consensus rules of the blockchain, wherein each new transaction or each new transaction slip among the one or more of the at least one new transaction or the at least one new transaction slip contains a variable that flags each new transaction as a rebroadcast transaction or a variable that flags each new transaction slip as a rebroadcast transaction slip.

8. The method of claim 7, wherein each new transaction slip that is rebroadcast is attached to each corresponding new transaction as spendable outputs to said new transaction.

9. The method of claim 7, further comprising:
determining whether a rebroadcast transaction among the at least one rebroadcast transaction fails at least one of an initial validation check as the rebroadcast transaction is no longer signed by an original transaction originator or a requirement that the rebroadcast transaction must have adequate inputs to pay for its outputs;

based on a determination that the rebroadcast transaction fails at least one of the initial validation check as the rebroadcast transaction is no longer signed by an original transaction originator or the requirement that the rebroadcast transaction must have adequate inputs to pay for its outputs, determining whether the rebroadcast transaction qualifies as a properly formatted rebroadcast transaction, based on one or more third criteria for transaction validity defined in consensus rules of the blockchain; and based on a determination that the rebroadcast transaction qualifies as a properly formatted rebroadcast transaction, designating the rebroadcast transaction as a valid rebroadcast transaction.

10. The method of claim 1, wherein re-including, with the first node, the at least one transaction or the at least one transaction slip in a subsequent candidate block comprises re-including, with the first node and in a subsequent candidate block, the at least one transaction or the at least one transaction slip together with other data that is initially associated with or attached to an original transaction from which the rebroadcast transaction is sourced, wherein the at least transaction or the at least one transaction slip and the other data are sufficient to enable at least partial reconstruction of the original transaction, regardless of whether the original transaction has been pruned from the blockchain.

11. The method of claim 1, further comprising:
determining whether any credit associated with data contained in at least one unspent transaction slip or transaction remains; and based on a determination that some credit associated with data contained in the at least one unspent transaction slip or transaction remains, using at least a portion of the remaining credit to pay for rebroadcasting of the at least one unspent transaction slip or transaction in a subsequent block of the blockchain, and reducing the amount of the remaining credit available in the rebroadcast transaction slip or transaction.

12. The method of claim 1, further comprising:
adding, to the rebroadcast at least one transaction, ancillary data that is generated by consensus rules of the blockchain, the ancillary data comprising at least one of a variable that stores information regarding a number of times that a transaction or its corresponding transaction slip has been rebroadcast, a type of rebroadcast fee that has been applied, or additional cryptographic signatures that can be used to reconstruct an original transaction from which the rebroadcast at least one transaction is sourced.

13. The method of claim 1, wherein the re-included at least one transaction or the re-included at least one transaction slip has a data structure comprising at least one of payment information, ancillary block data, rebroadcast request field, data that is validated in rebroadcast, or a cryptographic signature.

14. The method of claim 1, wherein at least one of credit or data that is originally associated with an original transaction or an original transaction slip included in a blockchain is stored in an ancillary data structure, wherein the ancillary data structure comprises at least one of a database or an in-memory data table, and wherein the data that is stored in this ancillary data structure is updated during the process of transaction rebroadcasting.

15. The method of claim 1, wherein a fee paid for rebroadcasting transactions or transaction slips is added to revenue paid to a block producer as part of compensation that block producers receive for operating the blockchain network.

16. The method of claim 1, wherein a fee paid for rebroadcasting transactions or transaction slips is added to a treasury of the blockchain and released slowly over time to the blockchain network as a coinbase reward to the blockchain network that pays for network operations without all revenues going directly to a producer of a block that contains the rebroadcast transactions or transaction slips.

17. The method of claim 1, wherein a fee paid for rebroadcasting transactions or transaction slips is determined dynamically to cost a multiple of a fee paid for new transactions included in blocks of the blockchain network.

18. The method of claim 1, wherein a fee paid for rebroadcasting transactions or transaction slips is increased with every additional rebroadcasting.

19. The method of claim 1, wherein a fee paid for rebroadcasting transactions or transaction slips is determined according to at least one of a size of data that is already stored on the blockchain or space that is available for new transactions or transaction slips.

20. The method of claim 1, wherein different fee multipliers are applied to rebroadcasting of transactions or transaction slips.

21. The method of claim 1, further comprising:
providing users who originate transactions with one or more of an option to designate one or more data in at least one transaction as data that should not be rebroadcast, an option to designate one or more transactions as transactions that should not be rebroadcast, or an option to designate one or more transaction slips as transaction slips that should not be rebroadcast.

22. A node among a plurality of nodes in a peer-to-peer blockchain network, the node comprising:
at least one processor; and
a non-transitory computer readable medium communicatively coupled to the at least one processor, the non-transitory computer readable medium having stored thereon computer software comprising a set of instructions that, when executed by the at least one processor, causes the node to:
identify at least one of one or more transactions or one or more transaction slips in at least one block preceding an identified block in a blockchain;
determine whether each of the identified at least one of the one or more transactions or the one or more transaction slips satisfies one or more criteria for rebroadcasting; and
based on a determination that at least one transaction or at least one transaction slip among the identified at least one of the one or more transactions or the one or more transaction slips satisfies the one or more criteria for rebroadcasting, re-include the at least one transaction or the at least one transaction slip in a subsequent candidate block that is produced and offered to one or more other nodes among the plurality of nodes in the peer-to-peer blockchain network for validation and inclusion in the blockchain.

23. A system, comprising:
a node among a plurality of nodes in a peer-to-peer blockchain network, the node comprising:
at least one processor; and
a non-transitory computer readable medium communicatively coupled to the at least one processor, the non-transitory computer readable medium having stored thereon computer software comprising a set of instructions that, when executed by the at least one processor, causes the node to:
identify at least one of one or more transactions or one or more transaction slips in at least one block preceding an identified block in a blockchain;
determine whether each of the identified at least one of the one or more transactions or the one or more transaction slips satisfies one or more criteria for rebroadcasting; and
based on a determination that at least one transaction or at least one transaction slip among the identified at least one of the one or more transactions or the one or more transaction slips satisfies the one or more criteria for rebroadcasting, re-include the at least one transaction or the at least one transaction slip in a subsequent candidate block that is produced and offered to one or more other nodes among the plurality of nodes in the peer-to-peer blockchain network for validation and inclusion in the blockchain.

* * * * *